US012561682B2

(12) United States Patent
Chan et al.

(10) Patent No.: US 12,561,682 B2
(45) Date of Patent: *Feb. 24, 2026

(54) METHODS AND SYSTEMS FOR BLOCKCHAIN-IMPLEMENTED SCRIPT-BASED BYTE INTERPRETATION

(71) Applicant: nChain Licensing AG, Zug (CH)

(72) Inventors: Ying Chan, Cambridge (GB); Dean Kramer, London (GB)

(73) Assignee: NCHAIN LICENSING AG, Zug (CH)

( * ) Notice: Subject to any disclaimer, the term of this patent is extended or adjusted under 35 U.S.C. 154(b) by 1 day.

This patent is subject to a terminal disclaimer.

(21) Appl. No.: 18/670,565

(22) Filed: May 21, 2024

(65) Prior Publication Data

US 2024/0386426 A1      Nov. 21, 2024

Related U.S. Application Data

(63) Continuation of application No. 16/639,517, filed as application No. PCT/IB2018/055892 on Aug. 6, 2018, now Pat. No. 12,020,249.

(30) Foreign Application Priority Data

Aug. 15, 2017     (GB) ..................................... 1713046

(51) Int. Cl.
　　*G06Q 20/40*　　　　(2012.01)
　　*G06Q 10/10*　　　　(2023.01)
　　　　　　　(Continued)
(52) U.S. Cl.
　　CPC ........... *G06Q 20/401* (2013.01); *G06Q 10/10* (2013.01); *G06Q 20/02* (2013.01);
　　　　　　　(Continued)

(58) Field of Classification Search
　　CPC .. G06Q 20/401; G06Q 20/02; G06Q 20/0655; G06Q 20/1235; G06Q 20/389;
　　　　　　　(Continued)

(56) References Cited

U.S. PATENT DOCUMENTS

2016/0260171 A1　　9/2016　Ford et al.
2017/0091750 A1* 　3/2017　Maim ....................... H04L 9/14
　　　　　　　(Continued)

FOREIGN PATENT DOCUMENTS

CN　　　　106598579　A　　4/2017
WO　　　2017148527　A1　　9/2017
WO　　　2017173399　A1　　10/2017

OTHER PUBLICATIONS

"Arvind Narayanan et al., Bitcoin and Cryptocurrency Technologies, Feb. 9, 2016, Princeton University Press, pp. 79-84" (Year: 2016).*
　　　　　　　(Continued)

*Primary Examiner* — Courtney P Jones
(74) *Attorney, Agent, or Firm* — Tarolli, Sundheim, Covell & Tummino LLP

(57)　　　　　　ABSTRACT

The invention relates to distributed ledger technologies such as consensus-based blockchains, for example, a Bitcoin blockchain. Computer-implemented methods for a trustless, deterministic state machine that is embodied by the locking script of a spending transaction are described. The spending transaction transfers control of at least one digital asset or portion thereof. The spending transaction references a previous transaction that includes a locking script with a bytecode sequence. The spending transaction also includes a locking script with the same bytecode sequence. The spending transaction can be validated by verifying that the bytecode sequences of the locking scripts of the spending and previous transactions match one another. Control of the at least one digital asset or portion thereof can be transferred as (Continued)

a result of execution of the locking script. For example, the locking script can impose a set of conditions for validation of the spending transaction.

20 Claims, 16 Drawing Sheets

(51) Int. Cl.

| | |
|---|---|
| *G06Q 20/02* | (2012.01) |
| *G06Q 20/06* | (2012.01) |
| *G06Q 20/12* | (2012.01) |
| *G06Q 20/38* | (2012.01) |
| *G06Q 40/04* | (2012.01) |

(52) U.S. Cl.
CPC ..... *G06Q 20/0655* (2013.01); *G06Q 20/1235* (2013.01); *G06Q 20/389* (2013.01); *G06Q 40/04* (2013.01); *G06Q 20/38215* (2013.01); *G06Q 20/3825* (2013.01); *G06Q 20/3827* (2013.01); *G06Q 2220/10* (2013.01)

(58) Field of Classification Search
CPC .. G06Q 40/04; G06Q 2220/10; G06F 16/258; G06F 16/27
USPC .......................................................... 705/51
See application file for complete search history.

(56) References Cited

U.S. PATENT DOCUMENTS

| | | | |
|---|---|---|---|
| 2017/0180469 A1 | 6/2017 | Ford et al. | |
| 2017/0187535 A1 | 6/2017 | Middleton et al. | |
| 2017/0301047 A1 | 10/2017 | Brown et al. | |
| 2017/0344988 A1 | 11/2017 | Cusden et al. | |
| 2018/0005186 A1* | 1/2018 | Hunn | .................... G06F 16/219 |
| 2018/0183600 A1 | 6/2018 | Davis | |
| 2018/0349877 A9 | 12/2018 | Maim | |
| 2018/0365764 A1 | 12/2018 | Nelson | |
| 2019/0028276 A1 | 1/2019 | Pierce et al. | |
| 2019/0034246 A1 | 1/2019 | Miller et al. | |
| 2019/0043043 A1 | 2/2019 | Saraniecki et al. | |
| 2019/0080392 A1 | 3/2019 | Youb et al. | |
| 2020/0005255 A1* | 1/2020 | Wu | ......................... G06F 21/64 |
| 2020/0057760 A1* | 2/2020 | Zhao | ................... G06F 16/2379 |
| 2022/0237696 A1 | 7/2022 | Creighton, IV et al. | |

OTHER PUBLICATIONS

Anonymous, "Smart Contracts/EVM FAQ Counterparty," retrieved from https://web.archive.org/web/20170719092538/https://counterparty.io/docs/faq-smartcontracts/, Jul. 19, 2017, 7 pages.
Antonopoulos, "Bitcoin Book, " GitHub, retrieved from https://github.com/bitcoinbook/bitcoinbook, Feb. 2, 2018, 4 pages.
Antonopoulos, "Mastering Bitcoin—Unlocking Digital Cryptocurrencies," O'Reilly Media, Inc., Dec. 20, 2014, 282 pages.
Bashir, "Mastering Blockchain," Mastering Blockchain, Mar. 17, 2017, 28 pages.

Cryptokernel History, "History of CryptoKernel," retrieved from https://github.com/mitdci/CryptoKernel/commits/master/src/kernel/contract.h, Jul. 24, 2017, 2 pages.
Cryptokernel, "CryptoKernel C++ Library," retrieved from https://github.com/mit-dci/CryptoKernel/blob/master/src/kernel/contract.h, Jul. 24, 2017, 2 pages.
Dai et al., "Smart-Contract Value-Transfer Protocols on a Distributed Mobile Application Platform," retrieved from https://qtum.org/uploads/files/a2772efe4dc8ed1100319c6480195fb1.pdf, Mar. 2017, 27 pages.
Ethereum, "White Paper," retrieved from https://web.archive.org/web/20170729062422/https://github.com/ethereum/wiki/wiki/White-Paper, Jul. 29, 2017, 23 pages.
Ibmledger, "Blockchain-Samples/Contracts/Basic/Simple_ Contract," retrieved from https://github.com/ibm-watson-iot/blockchainsamples/tree/master/contracts/basic/simple_contract, Nov. 4, 2016, 11 pages.
International Search Report and Written Opinion mailed Oct. 22, 2018, Patent Application No. PCT/IB2018/055892, 13 pages.
Lerner, "Lumino Transaction Compression Protocol (LTCP)," retrieved from https://uploads.strikinglycdn.com/files/9dcb08c5-f5a9-430e-b7ba 6c35550a4e67/LuminoTransactionCompressionProtocolLTCP.pdf, Feb. 24, 2017, 10 pages.
Medium Dotcom, "Ethereum Direct," retrieved from https://ether.direct/2017/08/06/diving-into-the-ethereum-vm/, Aug. 6, 2017, 17 pages.
Mizrahi, "[bitcoin-dev] Building Blocks of the State Machine Approach to Consensus," retrieved from https://lists.linuxfoundation.org/pipermail/bitcoin-dev/2016-June/012777.html, Jun. 20, 2016, 3 pages.
Möser et al., "Bitcoin Covenants," Medical Image Computing and Computer-Assisted Intervention, Aug. 31, 2016, 16 pages.
Nakamoto, "Bitcoin: A Peer-to-Peer Electronic Cash System," Bitcoin, Oct. 31, 2008, https://bitcoin.org/bitcoin.pdf, 9 pages.
Poon et al., "Plasma: Scalable Autonomous Smart Contracts," retrieved from https://plasma.io/plasma.pdf, Aug. 11, 2017, 47 pages.
QTUM2, "What is UTXO ??," retrieved from https://forum.qtum.org/topic/86/what-is-utxo/3, Apr. 3, 2017, 4 pages.
Satoshi et al., "Connection Limits," Bitcoin Forum, Aug. 9, 2010, https://bitcointalk.org/index.php?topic=741.0; prev_next=prev, 2 pages.
Schoenfeld, "Ethereum/Research Chat Logs," retrieved from https://gitter.im/ethereum/research/archives/2016/04/27, Apr. 27, 2016, 32 pages.
Smart Contracts, "Smart Contracts—Web3j 2.1.0 Documentation," retrieved from https://web.archive.org/web/20170505090036/https://web3j.readthedocs.io/en/latest/smart_c ontracts.html, May 5, 2017, 4 pages.
UK Commercial Search Report mailed Dec. 29, 2017, Patent Application No. GB1713046.9, 8 pages.
UK IPO Search Report mailed Feb. 5, 2018, Patent Application No. GB1713046.9, 4 pages.
U.S. Appl. No. 62/539,724, "Method and Apparatus for Automated Committed Settlement of Assets", filed Aug. 1, 2017, Digital Asset, 22 pages.
Naoshia, Ishiguro, "Blockchain: A Book to Help You Understand", Learning from Bitcoin: Blockchain!!, Kawajo, Stone System Co. Ltd., Aug. 1, 2017, 1st Edition, 1st Print, 30 pages.

* cited by examiner

METHODS AND SYSTEMS FOR BLOCKCHAIN-IMPLEMENTED SCRIPT-BASED BYTE INTERPRETATION

CROSSREFERENCE TO RELATED APPLICATIONS

This application is a continuation of U.S. patent application Ser. No. 16/639,517, filed Feb. 14, 2020, entitled "METHODS AND SYSTEMS FOR BLOCKCHAIN-IMPLEMENTED SCRIPT-BASED BYTE INTERPRETATION," which is a 371 National Stage of International Patent Application No. PCT/IB2018/055892, filed Aug. 6, 2018, entitled "METHODS AND SYSTEMS FOR BLOCKCHAIN-IMPLEMENTED SCRIPT-BASED BYTE INTERPRETATION," which claims priority to United Kingdom Patent Application No. 1713046.9, filed on Aug. 15, 2017, the disclosures of which are herein incorporated by reference in their entirety.

FIELD OF INVENTION

This invention relates generally to blockchain technologies, and more particularly to blockchain transactions employing a spending transaction script. The invention is particularly suited for, but not limited to, use in automated execution of smart contracts.

BACKGROUND OF INVENTION

In this document, we use the term "blockchain" to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While "Bitcoin" may be referred to for the purpose of convenience and illustration in the present disclosure, it should be noted that the invention is not limited to use with the Bitcoin blockchain and alternative blockchain implementations and protocols fall within the scope of the present invention. For example, the invention may be useful in other blockchain implementations that have limitations similar to Bitcoin regarding what constraints can be encoded within transactions.

A blockchain is a peer-to-peer, electronic ledger which is implemented as a computer-based decentralised, distributed system made up of blocks which in turn are made up of transactions and other information. For example, with Bitcoin each transaction is a data structure that encodes the transfer of control of a digital asset between participants in the blockchain system, and includes at least one input and at least one output. In some implementations, transferring control of a digital asset can be performed by re-associating at least a portion of a digital asset from a first entity to a second entity. Each block contains a hash of the previous block so that blocks become chained together to create a permanent, immutable record of all transactions which have been written to the blockchain since its inception. Transactions contain small programs known as scripts embedded into their inputs and outputs that specify how and by whom the outputs of the transactions can be accessed. On the Bitcoin platform, these scripts employ a stack-based scripting language.

That is, the stack-based scripting language may utilize a data structure called a stack. With the stack, values can be pushed onto the top of the stack or popped from the top of the stack.

In order for a transaction to be written to the blockchain, it must be "validated." Network nodes (miners) perform work to ensure that each transaction is valid, with invalid transactions rejected from the network. A node can have standards for validity different from other nodes. Because validity in the blockchain is consensus based, a transaction is considered valid if a majority of nodes agree that a transaction is valid. Software clients installed on the nodes perform this validation work on transactions referencing an unspent transaction (UTXO) in part by executing the UTXO locking and unlocking scripts. If execution of the locking and unlocking scripts evaluates to TRUE and other validation conditions, if applicable, are met, the transaction is valid by the node. The validated transaction is propagated to other network nodes, whereupon a miner node can select to include the transaction in a blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e., added to the public ledger of past transactions. The transaction is considered to be confirmed when a sufficient number of blocks are added to the blockchain to make the transaction practically irreversible.

One area of current research is the use of the blockchain for the implementation of "smart contracts." These are computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results.

In embodiments, a smart contract is "smart" in the sense that the creator, or some other specific entity, is not tasked with enforcement and/or execution of the smart contract. That is, although interaction with specific entities can be encoded at specific steps in the smart contract, the smart contract can otherwise be automatically executed and self-enforced by machine. It is machine readable and executable. In some examples, automatic execution refers to any entity being able to spend the UTXO and having an incentive (e.g., reward) to do so. Note that, in such examples, the "any entity" that is able to spend the UTXO refers to an entity that is able to create the unlocking script without being required to prove knowledge of some secret. In other words, the spending transaction can be validated without verifying that the source of the data has access to a cryptographic secret (e.g., private asymmetric key, symmetric key, etc.). Also, in such examples, self-enforcement refers to the validation nodes of the blockchain network being caused to enforce the spending transaction according to the constraints. In some examples, "spending" a UTXO refers to creating a spending transaction that references the UTXO and executes as valid.

A blockchain transaction output includes a locking script and information regarding ownership of digital assets such as Bitcoins. The locking script, which may also be referred to as an encumbrance, "locks" the digital assets by specifying conditions that are required to be met in order to spend the output. For example, a locking script could require that certain data be provided in an unlocking script to unlock the associated digital assets. The locking script is also known as "scriptPubKey" in Bitcoin. A technique for requiring a party to provide data to unlock a digital asset involves embedding a hash of the data inside the locking script.

Thus, it is desirable to provide for improved methods and systems that improve blockchain technology in one or more of these aspects. Thus, in accordance with the present invention, there is provided a method and corresponding system as defined in the appended claims.

SUMMARY OF THE INVENTION

The invention may be described as a verification method/system, and/or as a control method/system for controlling the exchange or transfer of a digital resource or asset via a blockchain. The terms "asset" and "resource" may be used interchangeably herein. The digital resource may be a token, or a portion of cryptocurrency, etc. As explained below, the invention may also be described as a security method/system for new, improved and advantageous ways of performing operations via a blockchain network or platform.

As will be described in greater detail below, in an embodiment, a trustless, deterministic state machine can be embodied by a (first) locking script realized or represented by a bytecode sequence. In embodiment(s), the locking script can be, or comprise, part of a parameterized smart contract whereby a first ("spending") blockchain transaction is used to transfer control of a digital asset/resource. The spending transaction may reference a previous transaction that includes a locking script which contains a bytecode sequence. The spending transaction may also include a locking script which contains a bytecode sequence such that the locking scripts of the previous transaction and the spending transaction share the same bytecode sequence. The spending transaction may be received at a node in a blockchain network. It may be validated by obtaining the previous transaction and verifying that the locking scripts of the previous transaction and the spending transaction share the same bytecode sequence.

In other embodiments, the locking script of the previous transaction may also include interpreter code that is used to interpret the bytecode sequence of the locking script of the previous transaction and the locking script of the spending transaction can also include interpreter code such that the locking scripts of the previous transaction and the spending transaction share the same interpreter code. The interpreter code may support translation of at least one high-level bytecode operation into low-level bytecode operations that are executed by the node that validates the spending transaction. In this case, the validation of the spending transaction can further involve verifying that the locking scripts of the previous transaction and the spending transaction share the same interpreter code.

As will be described in greater detail below, in an embodiment, the bytecode sequence and/or interpreter code of a locking script may be replicated as part of the locking script of an ordered number (or sequence) of spending transactions until a termination condition is fulfilled.

Thus, in accordance with an embodiment of the invention, there may be provided a computer-implemented method comprising:

receiving a first blockchain transaction ("spending transaction") to transfer control of at least one digital asset or portion thereof, wherein the first blockchain transaction includes a (first) locking script represented by a bytecode sequence, and wherein the first blockchain transaction references a previous (blockchain) transaction that includes a (second) locking script represented by a bytecode sequence such that the first and second locking scripts share the same bytecode sequence; the first transaction may be referred to as a "spending" transaction. It may be received at a node in a blockchain network. It may be arranged to transfer control of the digital asset (which may also be referred to as a "digital resource") to an entity, party or node via the network.

The method also comprises the step of validating the first (spending) blockchain transaction by verifying that the bytecode sequence of the first locking script matches the bytecode sequence of the locking script of the previous transaction (i.e. the second locking script).

Preferably, the first blockchain transaction further includes interpreter code, the previous blockchain transaction further includes interpreter code such that the first blockchain transaction and the previous blockchain transaction share the same interpreter code for interpreting the bytecode sequence of the first and second locking scripts, and validating the first blockchain transaction further involves verifying that the interpreter code of the first blockchain transaction matches the interpreter code of the previous blockchain transaction.

Preferably, the first blockchain transaction is received and/or validated by a node in a blockchain network. Additionally or alternatively, the previous blockchain transaction may be stored on a blockchain maintained by nodes of the blockchain network. Additionally or alternatively, the first blockchain transaction may be generated by replicating at least part of the previous blockchain transaction. Additionally or alternatively, the first locking script may include at least one operation that verifies that the bytecode sequence of the first locking script matches the bytecode sequence of the second locking script. The interpreter code may be included as part of the first and second locking scripts. Additionally or alternatively, the interpreter code may support translation of at least one high-level bytecode operation into low-level bytecode operations that are executed by the node. Additionally or alternatively, the first locking script may include at least one operation arrange to verify that the interpreter code of the first locking script matches the interpreter code of the second locking script.

Preferably, the first and second locking scripts (i.e. the locking scripts of the spending and previous transactions) further include data relating to different execution states of the bytecode sequence shared by the first and second locking scripts, where such data is used to control execution of the interpretation of the bytecode sequence when validating the first blockchain transaction.

Preferably, the second locking script includes state data for a current execution state of the bytecode sequence as well as an execution pointer corresponding to the current execution state of the bytecode sequence, wherein the first locking script further includes state data for a next execution state of the bytecode sequence as well as an execution pointer corresponding to the next execution state of the bytecode sequence (of the locking script), and validating the first blockchain transaction further involves i) using the data representing the current execution state of the bytecode sequence to restore the current execution state of the bytecode sequence, ii) executing the bytecode sequence beginning at the execution pointer corresponding to the current execution state of the bytecode sequence and ending at the execution pointer corresponding to a next execution state of the bytecode sequence, and iii) comparing state data resulting from the execution of the bytecode sequence to the state data for the next execution state of the bytecode sequence of the second locking script as included in the first blockchain transaction in order to verify that such state data match.

Preferably, validating the first blockchain transaction further involves extracting the state data for the current execution state of the bytecode sequence from virtual memory, extracting the execution pointer corresponding to the current execution state of the bytecode sequence from virtual memory, and extracting the execution pointer corresponding to the next execution state of the bytecode sequence from virtual memory.

Preferably, the virtual memory stores the data relating to different execution states of the bytecode sequence in different first and second formats, wherein the first format is used to store such data as part of the locking script, and wherein the second format is suitable for manipulation of data in the virtual memory when executing the bytecode sequence of the locking script.

Preferably, the virtual memory comprises at least one stack data structure, the first format comprises a serialized byte format, and/or the second format comprises a stack format.

The method may further comprise: extracting state data for the current execution state of the bytecode sequence from the virtual memory by deserialization of data representing the current execution state of the bytecode sequence from the byte format to the stack format, and/or comparing state data resulting from the execution of the bytecode sequence to the state data for the next execution state of the bytecode sequence as included in the first (spending) blockchain transaction by serialization of the state data resulting from the execution of the bytecode sequence from the stack format to the byte format.

Preferably, control of the at least one digital asset or portion thereof is transferred as a result of execution of the first locking script, and the second locking script imposes a set of conditions for validation of the first blockchain transaction.

Preferably, the first blockchain transaction further includes an unlocking script, wherein execution of the unlocking script provides for data (which can be a determined data source or undetermined data source) that is used to derive a set of conditions for validation of the first blockchain transaction.

Preferably, at least part of the first blockchain transaction is replicated to generate a new blockchain transaction until a termination condition is fulfilled (such as when the digital asset associated with the first blockchain transaction is of insufficient size to be transferred).

Preferably, the first blockchain transaction and the previous blockchain transaction embody parts of a smart contract.

Also in accordance with the present invention there is provided a system arranged to implement any embodiment of the method(s) described above. The system may comprise:

a processor; and memory including executable instructions that, as a result of execution by the processor, causes the system to perform the computer-implemented method of any one of the embodiments described above.

There is also provided a non-transitory computer-readable storage medium having stored thereon executable instructions that, as a result of being executed by a processor of a computer system, cause the computer system to at least perform the computer-implemented method of any one of the embodiments described above.

Techniques described and suggested in the present disclosure improve the field of computing, specifically the field of blockchain technologies (including the execution of machine-executable smart contracts), by utilizing a blockchain network and cryptographic techniques to set and enforce criteria for reassociating or transferring digital assets. Additionally, techniques described and suggested in the present disclosure improve the functionality of blockchain networks by enabling blockchain transactions to function as state machines.

Moreover, techniques described and suggested in the present disclosure are necessarily rooted in computer technology in order to overcome problems specifically arising with respect to distributed ledger technologies and blockchain technologies using scripting languages (such as Bitcoin's Script) which have been specifically designed to restrict functionality for security reasons. For example, Bitcoin's Script language does not natively support complex flow control functionality (for example, loops) to occur. One advantage of this restriction is that the programs have predictable execution times. Another significant advantage of limiting scripts to linear or tree-like decision tasks is that this avoids infinite loops, which can be used as a means of launching exploits such as a denial of service (DoS or DDoS) attack. Thus, the security of blockchain transfer/exchange is enhanced and preserved but mechanisms need to be found to implement the functionality that is not permitted or provided by the language itself. The present invention provides an advance in this respect, addressing the current limitations of blockchain transactions at least in part, with an implementation of self-replicating blockchain transaction locking scripts. Thus, the invention provides a technical solution to a technical problem, and offers advantages in respect of security, improved control of digital assets exchange/transfer via a blockchain, and an extension of current blockchain-related functionality.

BRIEF DESCRIPTION OF THE DRAWINGS

These and other aspects of the present invention will be apparent from and elucidated with reference to the embodiment described herein. An embodiment of the present invention will now be described, by way of example only, and with reference to the accompanying drawings, in which.

DETAILED DESCRIPTION

Figure 1:
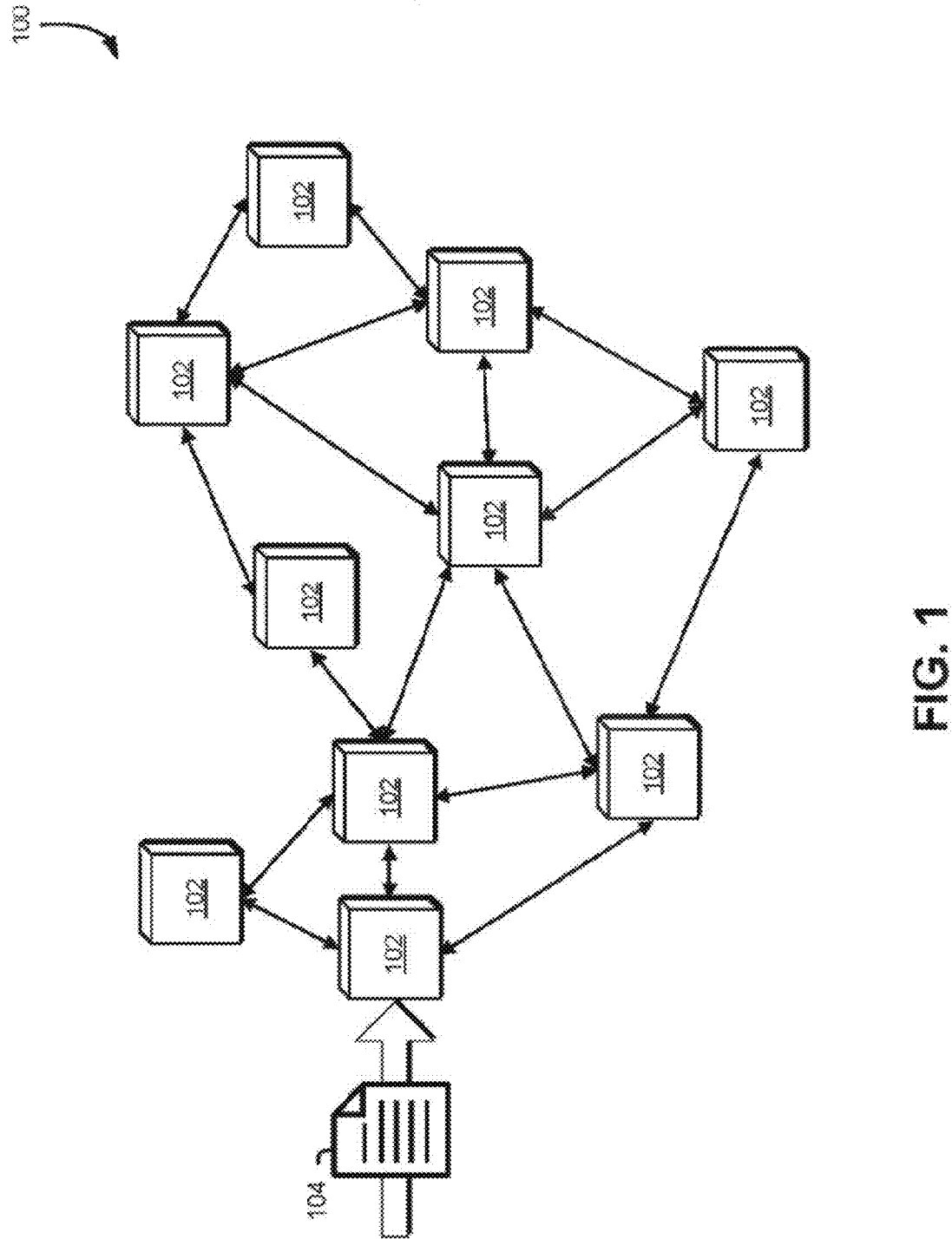
FIG. 1 illustrates a blockchain environment in which various embodiments can be implemented.

Reference will first be made to FIG. 1, which illustrates an example blockchain network 100 associated with a blockchain in accordance with an embodiment of the present disclosure. In the embodiment, the example blockchain network 100 is comprised of peer-to-peer distributed electronic devices running an instance of the blockchain protocol. In some examples, the distributed electronic devices are referred to as nodes 102. An example of a blockchain protocol is a Bitcoin protocol or any version/variation thereof.

Figure 11:
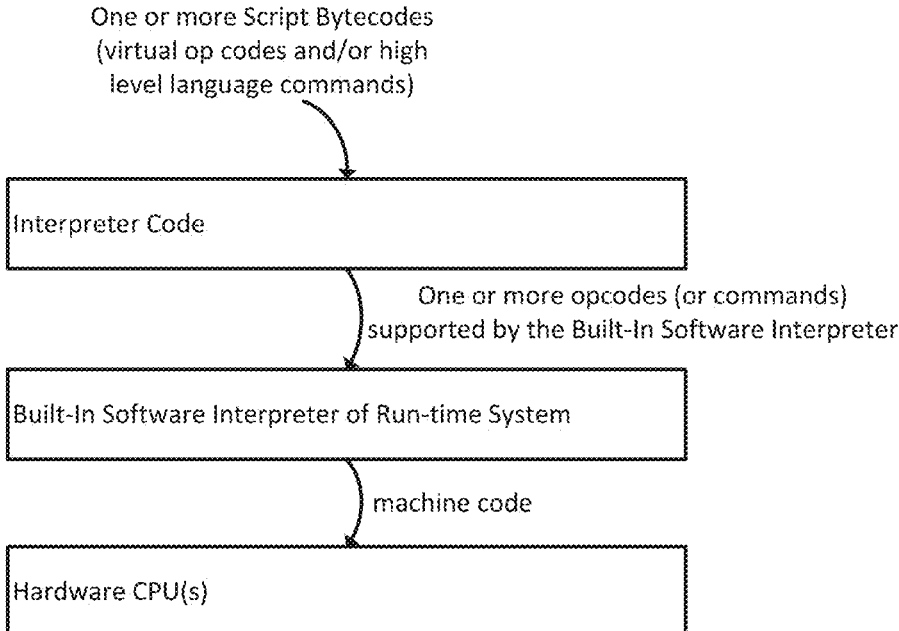
FIG. 11 is a schematic representation that illustrates the execution of the interpreter code of the locking script of FIG. 9, which cooperates with the execution of a built-in software interpreter of the run-time system (e.g., blockchain client) of a validation node in order to interpret the bytecode sequence of the locking script in accordance with an embodiment.

The nodes 102 may be comprised of any suitable computing device (e.g., by a server in a data centre, by a client computing device (e.g., a desktop computer, laptop computer, tablet computer, smartphone, etc.), by multiple computing devices in a distributed system of a computing resource service provider, or by any suitable electronic client device such as the computing device 2600 of FIG. 11).

In an embodiment, one or more of the nodes 102 are communicatively coupled to one or more other of the nodes 102. Such communicative coupling can employ one or more of wired or wireless communication links as are well known. In the embodiment, the nodes 102 each maintain at least a portion of a "ledger" of all transactions in the blockchain. In this manner, the ledger is a distributed ledger. A transaction processed by a node that affects the ledger is verifiable by one or more of the other nodes such that the integrity of the ledger is maintained.

In an embodiment, at least some of the nodes 102 are miner nodes that perform a mining process involving complex calculations, such as solving cryptographic problems. A miner node that solves the cryptographic problem creates a new block for the blockchain and broadcasts the new block to others of the nodes 102. The others of the nodes 102 perform a verification process that verifies the work of the miner node and, upon verification, accept the block into the blockchain (e.g., by adding it to the distributed ledger of the blockchain). In some examples, a block is a group of transactions, often marked with a timestamp and a "fingerprint" (e.g., a hash) of the previous block. In this manner, each block becomes linked to a previous block, thereby creating the "chain" that links the blocks in the blockchain. In embodiments, valid blocks are added to the blockchain by a consensus of the nodes 102. Also in some examples, a blockchain comprises a list of validated blocks.

In an embodiment, at least some of the nodes 102 operate as validating nodes that perform a validation process that validates transactions as described in the present disclosure. FIG. 1 shows one exemplary transaction labeled 104. In some examples, a transaction includes data that provides proof of ownership of a digital asset (e.g., a number of Bitcoins) and conditions for accepting or transferring ownership/control of the digital asset. In some examples, a "spending transaction" refers to a transaction that re-associates (e.g., transferring ownership or control) at least a portion of a digital asset, indicated by an unspent transaction output (UTXO) of a previous transaction, to an entity associated with a blockchain address. In some examples, a "previous transaction" refers to a transaction that contains the UTXO being referenced by the spending transaction. In some embodiments, the transaction can include an "unlocking script" and a "locking script" that encumbers the transaction with conditions that must be fulfilled before the transaction is validated and ownership/control is transferred by the transaction. In some embodiments, the locking script can be associated with an output of the transaction and can be configured to define one or more conditions needed to spend the output. Furthermore, the unlocking script of the spending transaction can be configured such that execution of the unlocking script provides data that is used to derive a set of conditions evaluated by the execution of the locking script of the previous transaction for validation of the spending transaction. In some embodiments, the blockchain address is a string of alphanumeric characters that is associated with an entity to which control of at least a portion of a digital asset is being transferred/re-associated. In some blockchain protocols implemented in some embodiments, there is a one-to-one correspondence between a public key associated with the entity and the blockchain address. Validation of a transaction may involve validating one or more conditions specified in the unlocking script and/or locking script of the transaction. Upon successful validation of the transaction, the validation node may propagate the transaction to other network nodes, whereupon a miner node can select to embed the transaction as part of a block that is added to the blockchain as described herein.

Some blockchain technologies, like Bitcoin, use an elliptic curve digital signature algorithm (ECDSA) as a mathematical scheme for digital signatures. In embodiments, the ECDSA is a cryptographic digital signature used to secure an UTXO from being spent by an unapproved entity. An elliptic curve digital signature (ECDS) in Bitcoin typically appears with a signature hash flag (SIGHASH type) appended to the end; however, it is contemplated that techniques of the present disclosure are usable with blockchain technologies that do not implement a SIGHASH type. In such blockchain technologies, the ECDS is contemplated to conform to the signature generation principles of the particular blockchain technologies.

In some embodiments, SIGHASH type refers to the set of fields to be extracted from a transaction before being serialized (e.g., canonicalized) and hashed. For example, the SIGHASH type can affect which fields of the transaction are included in the signature. In some examples, SIGHASH type can be one or more of SIGHASH_ALL, SIGHASH_NONE, SIGHASH_SINGLE, or SIGHASH_ANYONECANPAY as used in the Bitcoin protocol.

The Bitcoin protocol uses a scripting system called "Script" for performing various operations. In the present disclosure, various script operation codes (or op_codes) and keywords are referenced for performing various operations. However, it is contemplated that other blockchain technologies could implement different instruction sets, and therefore the operation codes described in the present disclosure are considered illustrative of the operations performed by the operation code rather than the specific operation code in Script. In some embodiments, the scripting system is a Turing incomplete instruction set (e.g., lacks support for loops, recursion, "goto" statements, etc.). In other embodiments, the scripting system can be a Turing complete instruction set.

Certain embodiments of the present disclosure can operate under the assumption that the scripting system or other system for implementing the sets of instructions described allow for more than 200 instructions (e.g., operation codes or op_codes) in a single script. Likewise, certain embodiments of the present disclosure further assume that:

the functionality provided by certain low-level operation codes (or low-level bytecode operations) are present and enabled in the system that executes the operation codes scripts/sets of instructions; and/or the functionality provided by certain high-level operation codes (or high-level bytecode operations) can be implemented by the creation of customized functions which are written to provide the desired behavior. These customized functions might be written to implement the functionality of op_codes which are present in the language but have been disabled, or may be "new" op_codes which provide specific functionality not natively provided for in the scripting language.

Examples of low-level operation codes that can be supported by the scripting system include:

OP_1SUB, in which the value "1" is subtracted from the top stack item.

OP_2DUP, which duplicates the top two stack items.

OP_ADD, which adds the top two items on the stack.

OP_CAT, which concatenates the top two items on the stack.

OP_CHECKSIG, in which a public key and signature are popped from the stack and verified against a signature of the transaction fields according to the SIGHASH type. If the signature is valid, 1 is returned, 0 otherwise.

OP_CHECKSIGVERIFY, which functions the same as OP_CHECKSIG, but OP_VERIFY is executed afterward.

OP_DROP, which removes or pops the top item of the stack.

OP_DUP, which duplicates the top stack item.

OP_ELSE, which, if the preceding OP_IF or OP_NOTIF or OP_ELSE was not executed, then these statements are executed; otherwise, if the preceding OP_IF or OP_NOTIF or OP_ELSE was executed, then these statements are not executed.

OP_ENDIF, which ends an if/else block.

OP_EQUAL, which returns 1 if the inputs are exactly equal, 0 otherwise.

OP_EQUALVERIFY, which is the same as OP_EQUAL, but runs OP_VERIFY afterward.

OP_FROMALTSTACK, which puts the input onto the top of the main stack and removes it from the alternate stack.

OP_HASH256, in which the input is hashed twice: first with SHA-256 and then with RIPEMD-160.

OP_IF, which, if the top stack value is not False, the statements are executed and the top stack value is removed.

OP_LEFT, which keeps only characters left of the specified point in a string.

OP_MUL, which multiplies the top two items on the stack.

OP_NOTIF, which, if the top stack value is False, the statements are executed and the top stack value is removed.

OP_RIGHT, which keeps only characters right of the specified point in a string.

OP_ROLL, in which the item that is n items deep in the stack is moved to the top.

OP_ROT, which rotates the top three items on the stack to the left.

OP_SIZE, which pushes the string length of the top element of the stack (without popping it).

OP_SUBSTR, which returns a section of a string.

OP_SWAP, in which the top two items on the stack are swapped.

OP_TOALTSTACK, which puts the input onto the top of the alternate stack and removes it from the main stack.

OP_TUCK, in which the item at the top of the stack is copied and inserted before the second-to-top item.

OP_VERIFY, which marks the transaction as invalid if top stack value is not true.

These low-level operation codes are currently supported by the scripting system of the Bitcoin protocol.

Examples of high-level operation codes that can be supported by the methods and systems of the present disclosure include:

OP_ECPX, which returns the x-coordinate of the elliptic curve point.

OP_BIGMOD, which returns the remainder after dividing the top two items on the stack.

OP_BIGMODADD, which performs modulus addition of the top two items of the stack modulus the third item of the stack.

OP_BIGMODINVERSE, which performs modulus negative exponent operation.

OP_BIGMODMUL, which performs modulus multiplication of the top two items of the stack modulus third item of the stack.

OP_DERENCODE, which encodes the top two items on the stack in DER format.

OP_ECPMULT, which performs elliptic curve point multiplication (also referred to as elliptic curve scalar multiplication) of the top two items on the stack.

These high-level operation codes can provide specific functionality not natively provided for in the scripting system of the Bitcoin protocol.

Figure 2:
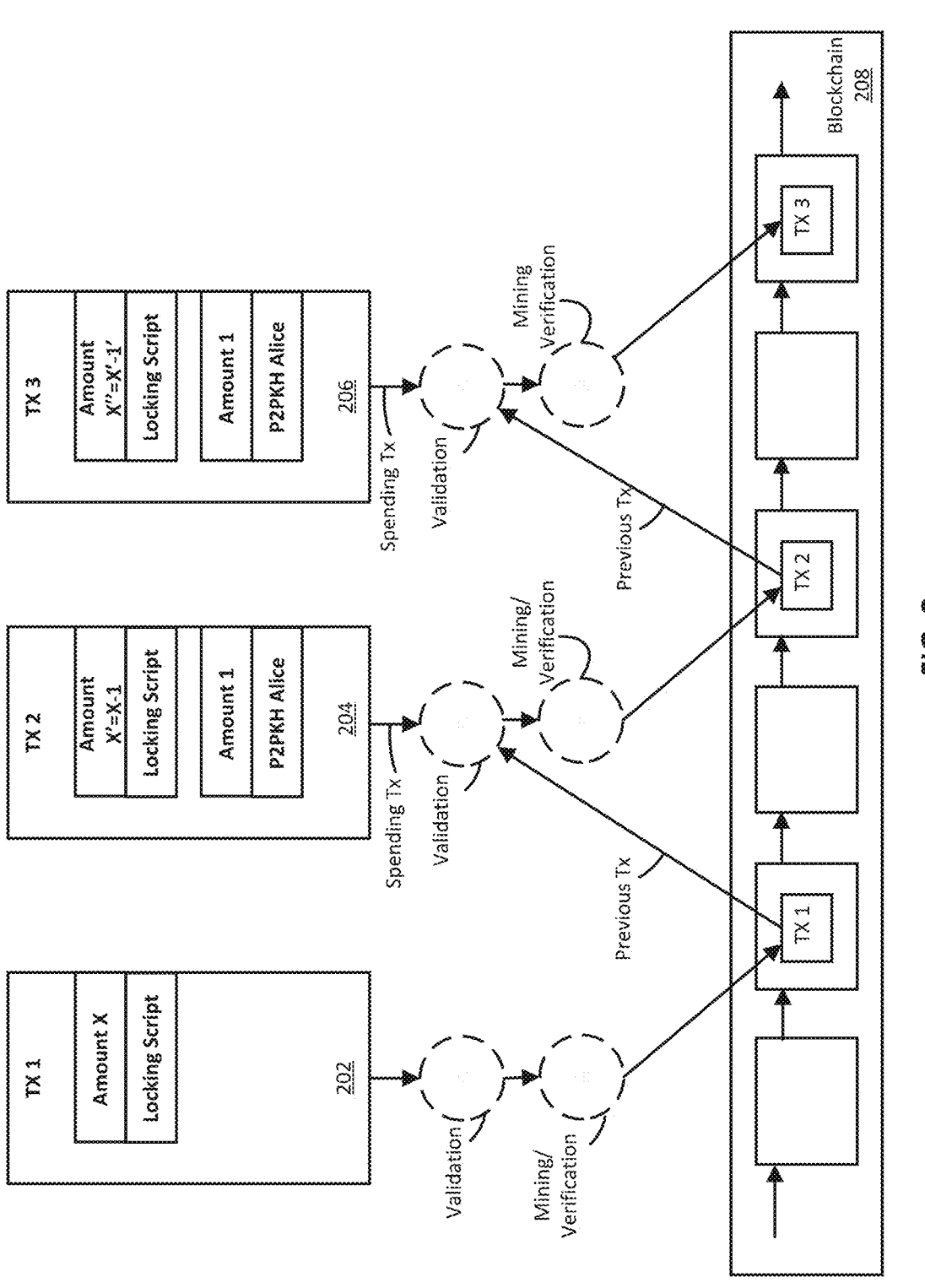
FIG. 2 illustrates an example of a smart contract that employs a locking script containing a bytecode sequence that is replicated over a sequence of transactions in accordance with an embodiment.

FIG. 2 illustrates an example embodiment of a smart contract that employs a locking script as part of sequence of transactions, where the locking script is configured to reduce a digital asset amount sent to a spending transaction by one unit each time and also pays 1 unit of the digital asset to Alice. That is, a first transaction 202 includes the locking script and holds an initial amount X. The first transaction 202 is validated and then mined such that it embedded in a block and then the block is verified such that it is stored on the blockchain 208. The locking script of the first transaction 202 (or part thereof) is replicated and incorporated as part of the locking script of the second transaction 204. The second transaction 204 is a spending transaction that is validated by executing the locking script of the first transaction 202, which is configured to pay 1 unit of the initial amount X held by the first transaction 202 to the pay-to-public-key-hash (P2PKH) address belonging to Alice and hold the new total (X'=X−1). In some examples, a P2PK or P2PKH can be used as an address to direct transfer of a digital asset to an entity associated with the respective public key. The second transaction 204 is then mined such that it embedded in a block and then the block is verified such that it is stored on the blockchain 208. The locking script of the second transaction 204 (or part thereof) is replicated and incorporated as part of the locking script of the third transaction 206. The third transaction 206 is a spending transaction that is validated by executing the locking script of the second transaction 204, which is configured to pay 1 unit of the amount X' held by the second transaction 204 to the pay-to-public-key-hash (P2PKH) address belonging to Alice, and hold the new total (X"=X'−1). The third transaction 206 is then mined such that it embedded in a block and then the block is verified such that it is stored on the blockchain 208. The locking script of the third transaction 206 (or part thereof) can be replicated and incorporated as part of the locking script of one or more follow on spending transactions as described above, if desired. Thus, it can be seen that as the process continues regardless of the initial amount X, a spending transaction will eventually be generated to output an unspendable amount of a digital asset (e.g., zero). This can be intuitively understood by observing that each subsequent spending transaction will have a smaller amount of digital asset than its previous transaction, even without deducting the minimum transaction fee deducted in various blockchain protocols. Consequently, the amount output will converge towards zero, at which point processing the transaction becomes pointless. However, embodiments of the present disclosure include a solution to this problem by implementing a termination condition to avoid such unspendable spending transactions. Once validated and stored on the blockchain, the respective sequence of transactions 202, 204, 206, etc. provide for transfer of control over the digital assets referenced by the transactions.

Furthermore, in embodiments, the sequence of transactions 202, 204, 206, etc. of the smart contract include a locking script with a bytecode sequence that is copied or replicated across all of the transactions. Thus, the validation process for each spending transaction of the smart contract can involve extracting the bytecode sequence of the locking script from the previous transaction, extracting the bytecode sequence of locking script from the spending transaction, and verifying that these two extracted bytecode sequences match one another.

A basic outline of this process is found in Table 1 below:

TABLE 1

| Unlocking Script of Spending Tx | Locking Script of Previous Tx |
| --- | --- |
| <Serialized Previous Tx> | <Script to Check Termination Condition> |
| <SIGHASH Type> | // If not terminated |
| <Set of Spending Tx Fields> | OP_NOTIF |
| |   <Script to Extract Bytecode Sequence of the Locking Script of the Spending Tx> |

TABLE 1-continued

| Unlocking Script of Spending Tx | Locking Script of Previous Tx |
| --- | --- |
| |   <Script to Extract Bytecode Sequence of the Locking Script of the Previous Tx> |
| |   // Check the Bytecode Sequences are the same |
| |   OP_EQUALVERIFY |
| | OP_ENDIF |
| | // Checking Injection of Previous Tx corresponding to Locking Script |
| | OP_SELFTXINJECTION |

As can be seen in the script above, the bytecode sequence of the locking script of a previous transaction (e.g., the first transaction 202), which is the locking script that will unlock the UTXO of the previous transaction, is verified against the bytecode sequence of locking script of a spending transaction (e.g., the second transaction 204), which will be redeemed in the future when this spending transaction is a previous transaction to another spending transaction (e.g., the third transaction 206). Thus, rather than creating a different spending transaction for each transaction, the locking script instead enforces that the bytecode sequences for both locking scripts must be identical. If the bytecode sequence for the locking script of the previous transaction is identical to the bytecode sequence of the locking script of the spending transaction, both locking scripts are assured to be genuine.

In embodiments, the termination condition avoids a situation where a previous transaction has insufficient funds but the locking script still validates; i.e., an un-spendable transaction. For example, a termination condition could be implemented to verify that there is enough of the digital asset to carry out the next transaction, otherwise terminate the validation. As a more specific example, if an initial pool contains 365 units of a digital asset plus an amount required for each transaction fee (e.g., enough for one transaction per day for a year), the termination condition could verify that the number of units remaining is more than is required to complete the transaction; e.g., as long as there are enough funds, then continue to validate the transaction. Otherwise, if there are insufficient funds, then the termination condition is fulfilled and validation halts. Thus, if there are insufficient funds on day 366, validating that the locking script of the 366$^{th}$ spending transaction is needless and the termination condition ensures that it terminates the replication of the transactions and associated locking scripts.

Note that the smart contract of FIG. 2 that pays digital assets to the pay-to-public-key-hash (P2PKH) address belonging to Alice as described above is exemplary. In embodiments, the principles and operation of the locking script as described herein can be extended to support a wide variety of smart contracts that use a blockchain. In this document, we use the term "smart contract" to include a contract whose terms are carried out by a sequence of transactions that employ a computerized transaction protocol to store the transactions on the blockchain.

Figure 3:
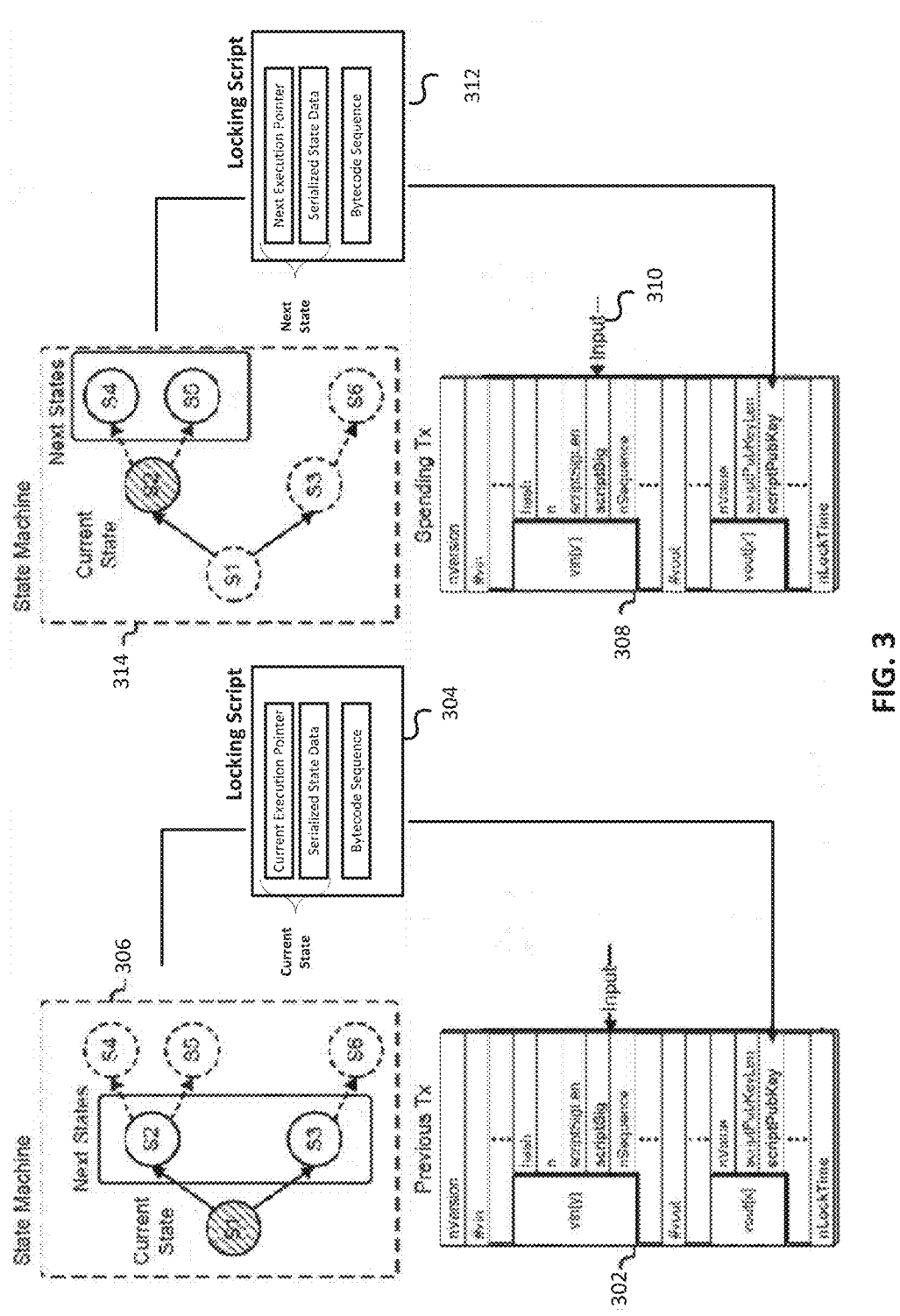
FIG. 3 illustrates an example of the locking script of FIG. 2, which employs a bytecode sequence that is interpreted to implement a trustless, deterministic state machine in accordance with an embodiment.

FIG. 3 illustrates exemplary transactions that employ a locking script with a common bytecode sequence to implement a trustless deterministic state machine in accordance with an embodiment of the present disclosure. More specifically, the common bytecode sequence is a computer program that can be thought of as a state machine that embodies a set of state rules with a well-defined set of states, whereby execution of the bytecodes of the bytecode sequence (computer program) provide for transitions between the states of the state machine.

As illustrated schematically in FIG. 3, a previous transaction 302 includes a locking script 304 with a bytecode sequence that represents a set of state rules for a state machine 306. The locking script 304 also includes a current state execution pointer (or "current execution pointer") and serialized state data that represent a current state within the states of the state machine 306 represented by the bytecode sequence. In the example shown, the current execution pointer and the serialized state data of the locking script 304 represent a current state "S1", and the set of state rules of the state machine 306 represented by the bytecode sequence offers two possible states ("S2" or "S3") for a next state that follows the current state S1. The current execution pointer included as part of the locking script 304 refers to an execution point of the bytecode sequence corresponding to the current state (in this case, state "S1"). The serialized state data included as part of the locking script 304 represents the state of the state machine represented by the bytecode sequence at the execution point referred to by the current execution pointer included in the locking script 304.

As can be seen in the example of FIG. 3, a spending transaction 308 includes a locking script 312 with a bytecode sequence that represents a set of state rules for a state machine 314, which is a copy of the state machine 306 represented by the bytecode sequence of the locking script 304 of the previous transaction 302. The locking script 312 also includes a next state execution pointer (or "next execution pointer") and serialized state data that represent one of the possible next states (in this case, state "S2") that follows the current state S1. The next execution pointer included as part of the locking script 312 refers to an execution point of the bytecode sequence corresponding to next state (in this case, state "S2") that follows the current state S1. The serialized state data included as part of the locking script 312 represents the state of the state machine represented by the bytecode sequence at the execution point referred to by the next execution pointer included in the locking script 312.

Note that the serialized state data that is included as part of the locking script 312 can be determined when creating the spending transaction by generating or accessing the next execution pointer that is included in the locking script 312, using the serialized state data of the locking script 304 of the previous transaction to restore the current execute state of the bytecode sequence of the locking script, and then executing the bytecode sequence of locking script. Such execution begins at the point (or operation) corresponding to the current execution pointer that is included in the previous transaction 302 and terminates at the point (or operation) corresponding to the next execution pointer that is included in the locking script 312. Such execution can also use the input data 310 determined by execution of the unlocking script of the spending transaction 308.

As part of validating the spending transaction 308, the unlocking script of the spending transaction 308 and the common bytecode sequence of the locking scripts 304/312 are executed. The execution of the common bytecode sequence takes as input, the input data 310 determined from execution of the unlocking script of the spending transaction 308 and the current state "S1" embodied by the current execution pointer and serialized state data that is included in the locking script 304 of the previous transaction 302 and the next execution pointer that is included in the locking script 312 of the spending transaction 308, and executes the common bytecode sequence of the locking scripts 304/312 from the point (or operation) corresponding to the current state execution pointer that is included in the locking script 304 of the previous transaction 302 to the point (or operation) corresponding to the next execution pointer that is included in the locking script 312 of the spending transaction 308. Such execution determines an appropriate next state (such as the second state "S2") from the set of state rules 314 represented by the common bytecode sequence. This next state (such as the state "S2"), which is determined from the execution of the common bytecode sequence to the point (or operation) corresponding to the next execution pointer that is included in the locking script 312 of the spending transaction 308, is organized as serialized state data that follows the serialized format of the state data that is included as part of the locking script 312 of the spending transaction 308. The serialized state data determined from the execution of the common bytecode sequence is then verified against the serialized state data that is included as part of the locking script 312 of the spending transaction 308. Again, rather than creating a different spending transaction for each transaction, the execution of the locking script enforces that the execution state that results from the execution of the bytecode sequence of the locking script during validation of the spending transaction matches the expected resultant execution state of the locking script as included in the spending transaction when creating the spending transaction. If these two resultant execution states are identical, the locking script is assured to be valid.

Note that the example of FIG. 3 shows that the states of the state machine represented by the bytecode sequence of the locking script 312 of the spending transaction 308 provides new states "S4" or "S5" that are possible for a next state transition from the state "S2." Note that the set of state rules represented by the bytecode sequences of the locking scripts may be coded as switch statement or other conditional statement (e.g., "if-then-else") parameterized by the current state and one or more inputs.

In embodiments, the bytecode sequence that is included in the locking script of a transaction represents the set of state rules of the state machine, and the execution pointer and the serialized state data of the locking script of the transaction represents state of the state machine. In such embodiments, the bytecode sequence of locking script of a transaction is copied or replicated to every spending transaction that attempts to transfer control of the digital asset to a next transaction, which must be linked to the current transaction. This process is repeated until the termination condition is fulfilled. Because the input data determined from the execution of the unlocking script of the spending transaction is not fixed and can be undetermined data, the state of the state machine can be made to change based on particular external inputs. Thus, the undetermined data provides the input that can affect the next state.

Furthermore, the number of bytecode operations of the locking script that will be executed when validating the spending transaction, which is dictated by the difference between the execution pointer of the current execution state of bytecode sequence of the locking script as included in the previous transaction and the execution pointer of the next execution state of bytecode sequence of the locking script as included in the spending transaction, can be varied by design by selecting or varying the execution pointer of the next execution state of the bytecode sequence of the locking script as included in the spending transaction. In this manner, the number of bytecode operations of the locking script that will be executed when validating the spending transaction can be either constrained or be used in parameterizing a constraint on the spending transaction (which is the transaction spending the locking script). This parameterized constraint can be used to limit the number of bytecode operations executed between transactions (for example, to avoid inefficient operation of the bytecode sequence of the smart contract), to logically partition the bytecode sequence of the smart contract into different segments that are executed over a sequence of spending transactions, to calculate a reward for the entity creating the new transaction based on the parameterized constraint, or for other possible uses.

In an illustrative example, Alice loans Bob some money and Bob agrees to pay Alice back. A trustless, deterministic state machine, as described above, can be used to implement a smart contract that represents the payments that Bob makes to Alice. For example, the smart contract could be constructed such that Bob makes a payment to Alice every month for the next three months, and, if a payment is missed, Bob's debt goes into debt collection phase. Thus, as long as Bob makes his monthly payment, the current state remains in repayment state. However, if an external entity provides input that indicates that Bob has missed a payment, then the state branches to missed payment state. In the missed payment state, Alice can release the transaction and turn it over to a debt collector, whereupon the trustless deterministic state machine switches to a debt collection state. In the debt collection state, the debt collector will collect the debt from Bob. Such a smart contract can be created using variations on the scripts of the embodiments depicted in FIGS. 2 and 3.

In another example, Alice is a very charitable person who is giving away 1 unit of a digital asset every month. Her rules are that anyone can claim the digital asset, but only 1 unit can be claimed per month. Alice creates a smart contract in the manner described in the present disclosure and seeds it with an initial pool of 3 units of the digital asset. Alice can construct a script that allows any entity to take 1 unit of the digital asset per month. The remaining portion of the digital asset is replicated to the succeeding smart contract.

In other embodiments. the principles and operation of the locking script as described herein can be extended to support a wide variety of smart contracts that use a blockchain.

The following Table 2 illustrates an example of unlocking and locking scripts that implement a trustless deterministic state machine of the present disclosure.

TABLE 2

| Unlocking Script of Spending Tx | Locking Script of Previous Tx |
|---|---|
| <External Sig'><External Data><br><Serialized Previous Serialized Tx><br><SIGHASH Type><br><Serialized Set of Spending Tx Fields> | <Script to Check Termination Condition><br>// If not terminated<br>OP_NOTIF<br>// Check Smart Contract<br><Script to Extract the Bytecode Sequence of the Locking Script of the Serialized Spending Tx><br><Script to Extract the Bytecode Sequence of the Locking Script of the Serialized Previous Tx><br>// Check that the Bytecode Sequences of the Locking Scripts are the same<br>OP_EQUALVERIFY<br><Script to Restore Current State using the Current State Data of the Locking Script><br><Script to Extract Current State Execution Pointer of the Locking Script><br><Script to Extract Next State Execution Pointer of the Locking Script><br>// Read Input<br><Script to Read Input from the Unlocking Script of the Spending TX><br><Script to Execute the bytecode sequence of the Locking Script, where such execution begins at the Current State Execution Pointer and ends at the Next State Execution Pointer; such execution can involve interpretation of the bytecode sequence of the Locking Script><br>// Check that the resulting execution state of the bytecode sequence evaluates as true<br>OP_VERIFY<br><script to store the resulting execution state of the bytecode sequence of the Locking Script as Serialized Next State Data ><br><Script to retrieve Serialized Next State Data as included in the Locking Script of the Spending Tx><br>// Check that the Serialized Next State Data that results from execution of the bytecode sequence of the Locking Script matches the Serialized Next State Data as included in the Locking Script of the Spending Tx<br>OP_EQUALVERIFY<br>OP_ENDIF<br>// Check that Previous Tx, SIGHASH Type, and Spending Tx have been injected<br>OP_SELFTXINJECTION |

Figure 4A:
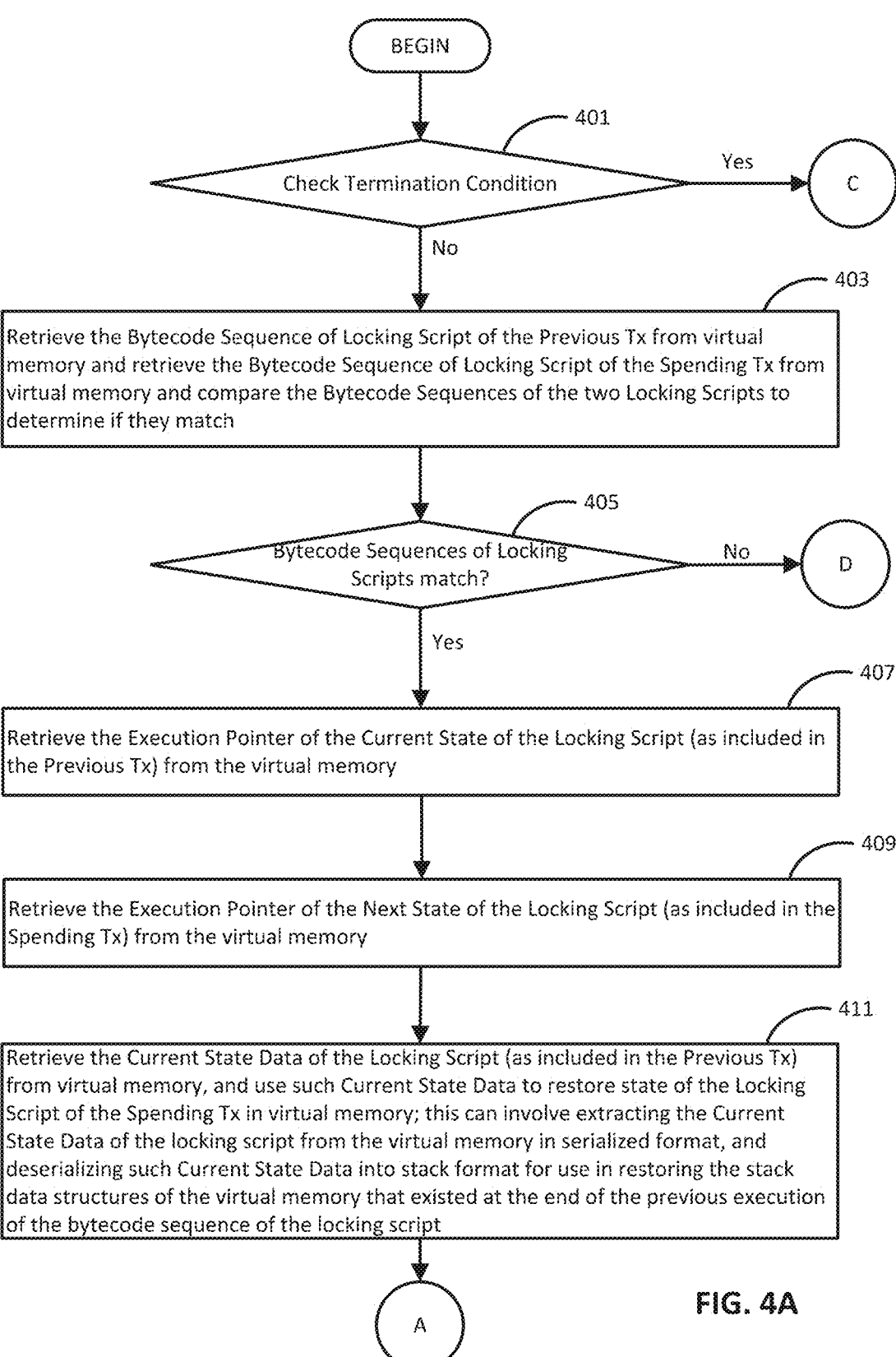
FIGS. 4A to 4C, collectively, is a flow chart that illustrates an example of operations that execute the unlocking script of the spending transaction and the locking script of the previous transaction of FIG. 3 in accordance with an embodiment.
Figure 4B:
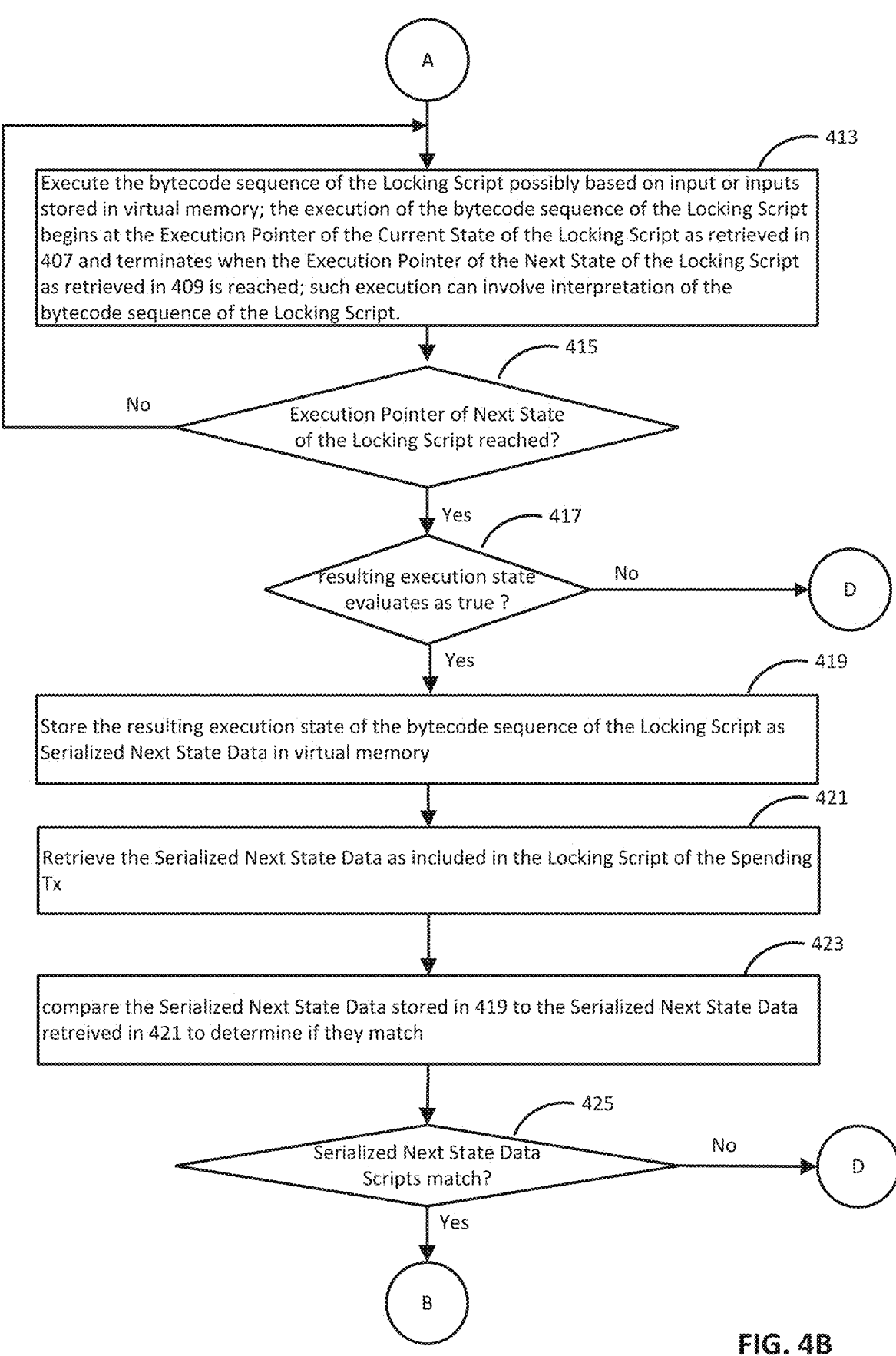
Figure 4C:
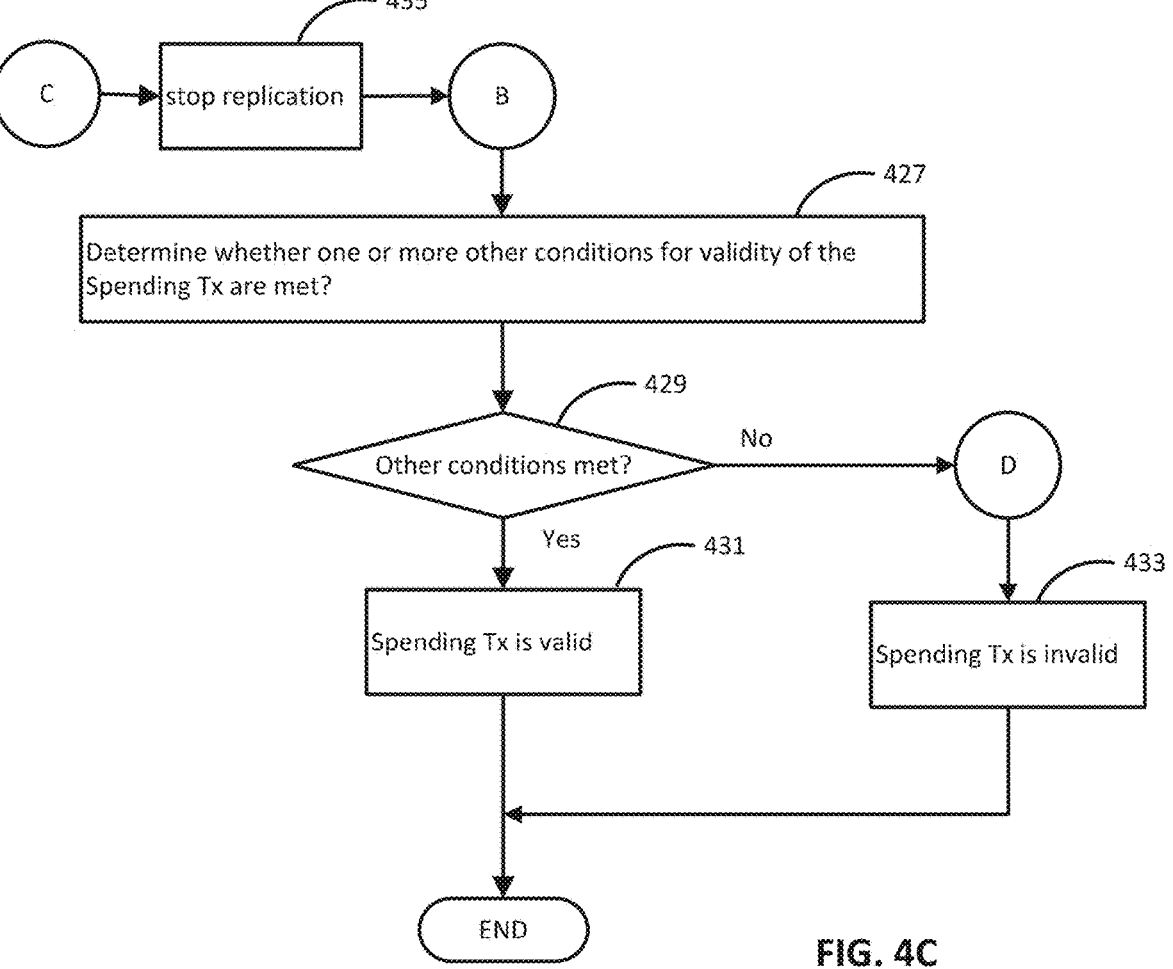

FIGS. 4A-4C, collectively, is a flowchart illustrating exemplary operations that execute the unlocking script of a spending transaction and the locking script of a previous transaction as part of smart contract. The operations can be part of a validation process of the spending transaction. The spending transaction includes a locking script with a byte-code sequence which implements a trustless deterministic state machine in accordance with an embodiment of the present disclosure. The locking script also includes a next state execution pointer (or "next execution pointer") and serialized state data that represent the next execution state of the state machine. The next execution pointer includes as part of the locking script refers to an execution point of the bytecode sequence corresponding to the next execution state. The serialized state data includes as part of the locking script represents the execution state of the state machine represented by the bytecode sequence at the execution point referred to by the next execution pointer included in the locking script of the spending transaction.

Note that the serialized state data that is included as part of the locking script of the spending transaction can be determined when creating the spending transaction by generating or accessing the next execution pointer that is included in the locking script of the spending transaction, using serialized state data of the locking script of the previous transaction to restore the current execution state of the state machine, and then executing the bytecode sequence of locking script. Such execution begins at the point (or operation) corresponding to the current execution pointer that is included in the locking script of the previous transaction and terminates at the point (or operation) corresponding to the next execution pointer that is included in the locking script of the spending transaction. Such execution can also use the input of the unlocking script of the spending transaction. It is contemplated that the creation of the spending transaction can involve operations involving a wallet, an agent node, or some other node of the blockchain network.

Some or all of the operations of FIGS. 4A-4C (or any other processes described, or variations and/or combinations of those processes) can be performed under the control of one or more computer systems configured with executable instructions and/or other data, and can be implemented as executable instructions executing collectively on one or more processors. The executable instructions and/or other data can be stored on a non-transitory, computer-readable storage medium (e.g., a computer program persistently stored on magnetic, optical, or flash media).

For example, some or all of the operations of FIGS. 4A-4C can be performed by a validation node in an example blockchain network, such as the example blockchain network 100 of FIG. 1. Such a validation node may be comprised of any suitable computing device (e.g., by a server in a data centre, by a client computing device, by multiple computing devices in a distributed system of a computing resource service provider, or by any suitable electronic client device such as the computing device 2600 of FIG. 13).

The operations of FIGS. 4A-4C verify that the bytecode sequences of the locking scripts of the previous transaction and spending transaction are the same, obtain a current execution state from the previous transaction, obtain inputs from the execution of the unlocking script of the spending transaction, determine the next execution state based at least in part on interpretation of the bytecode sequence of the locking scripts, and verify that the next execution state as determined from the execution of the locking script matches the next execution state represented by next state data included as part of the locking script of the spending transaction. The operations of FIGS. 4A-4C reflect a variation of the example scripts found in Table 2. It is assumed that the locking script (e.g., scriptPubKey) of the previous transaction as well as the unlocking script (e.g., scriptSig) and the locking script (e.g., scriptPubKey) of the spending transaction are all stored in virtual memory, which can be realized by one or more run-time data structures, such as a stack, stack frame or heap.

In 401, it is determined whether a termination condition is fulfilled. In embodiments, the termination condition can be a condition, which upon fulfillment, causes the state-machine transitions represented by the bytecode sequence of the locking script to end. If the termination condition is fulfilled, the operations proceed to 435 where further replication of the locking script is avoided such that the replication of the locking script as part of the smart contract comes to an end and the operations continue to 427 and 429 as described below. If the termination condition is not fulfilled, the operations continue to 403.

In 403, the bytecode sequence of the locking script of the previous transaction is retrieved from the virtual memory and the bytecode sequence of the locking script of the spending transaction is retrieved from the virtual memory, and the bytecode sequences of the two locking scripts are compared to one another to determine if they match.

In 405, it is determined if the bytecode sequences of the two locking scripts compared in 403 match one another. If not, the operations continue to 433 whereupon the spending transaction is determined to be invalid. If so, the operations continue to 407.

In 407, the execution pointer for the current execution state of the bytecode sequence of the locking script (as included in the locking script of the previous transaction) is retrieved from the virtual memory.

In 409, the execution pointer for the next execution state of the bytecode sequence of the locking script (as included in the locking script of the spending transaction) is retrieved from the virtual memory.

In 411, the current state data of the locking script (as included in the locking script of the previous transaction) is retrieved from the virtual memory and is used to restore the execution state of the bytecode sequence of the locking script in virtual memory. For example, the current state data of the locking script can be extracted from the virtual memory in the serialized format, and then deserialized into the stack format for use in restoring the stack data structures of the virtual memory that existed at the end of the previous execution of the bytecode sequence of the locking script (where the execution pointer was at the current state execution pointer as included in the locking script of the pervious transaction).

In 413, the bytecode sequence of the locking script (as included in the locking script of the previous transaction) is executed possibly based on input or inputs stored in virtual memory. The execution of the bytecode sequence of the locking script begins at the execution pointer for the current execution state of the bytecode sequence of the locking script as retrieved in 407 and terminates when the execution pointer for the next execution state of the bytecode sequence of the locking script as retrieved in 409 is reached. In embodiments, the bytecodes of the bytecode sequence of the locking script are computer instructions that are designed for efficient execution that involves interpretation by a software interpreter that is part of the run time system (e.g., blockchain client) of the node that validates the spending transaction, but are not machine code (and therefore not tied to any particular CPU hardware). The execution of the software interpreter can be configured to translate the bytecodes of the bytecode sequence segment (e.g., from the execution pointer of the current execution state of the bytecode sequence of the locking script to the execution pointer of the next execution state of the bytecode sequence of the locking script) into machine code which is suitable for execution on the particular CPU hardware of the node that validates the spending transaction as necessary at runtime and execute the machine code on the particular CPU hardware. The execution of the software interpreter can translate the bytecodes of the bytecode sequence segment into machine code sequentially one bytecode at a time (e.g., simple interpretation) or possibly employ just-in-time compilation methods where the bytecode sequence segment (or portions thereof) are compiled into machine code as necessary at runtime and then the resulting machine code is executed. The resulting machine code can possibly be cached and reused later without needing to be recompiled.

In 415, it is determined whether the execution of the bytecode sequence of the locking script has reached a point corresponding to the execution pointer for the next execution state of the bytecode sequence of the locking script. If not, the operations revert to 413 where the execution of the bytecode sequence of the locking script continues. If so, the operations continue to 417.

In 417, it is determined whether the resulting execution state as stored in the virtual memory evaluates as true. In embodiments, this check ensures that both the operations of the unlocking script of the spending transaction and the operations of the locking script of the previous transaction have completed without error and that any and all conditions that are encoded by the unlocking script of the spending transaction and the locking script of the previous transaction have been satisfied. If not, the operations continue to 433 whereupon the spending transaction is determined to be invalid. If so, the operations continue to 419.

In 419, the resulting execution state of the bytecode sequence of the locking script as stored in virtual memory (after the execution pointer for the next execution state of the bytecode sequence of the locking script is reached) is organized and stored as serialized state data representing the next execution state of the bytecode sequence of the locking script. The serialized state data is stored in the virtual memory in the serialized format as included in the spending transaction.

In 421, the serialized state data representing the next execution state of the bytecode sequence of the locking script is retrieved from the virtual memory.

In 423, the serialized state data representing the next execution state of the bytecode sequence of the locking script as determined in 419 is compared to the serialized state data representing the next execution state of the bytecode sequence of the locking script as included in the spending transaction as retrieved from the virtual memory in 421 to determine if the serialized state data match.

In 425, it is determined whether the serialized state data match. If not, the operations continue to 433 whereupon the spending transaction is determined to be invalid. If so, the operations continue to 427 and 429.

In 427 and 429, the operations determine whether one or more other conditions for validity of the spending transaction are met. Such conditions can involve other constraints specified in the locking script or the unlocking script of the spending transaction. If so, the operations continue to 431 whereupon the spending transaction can be considered valid by the system performing the validation process. If not, the operations continue to 433 whereupon the spending transaction is determined to be invalid. Note that one or more of the operations performed in 401-435 may be performed in various orders and combinations, including in parallel.

Also note that if and when the spending transaction is determined to be valid (e.g., in 431) and possibly stored on the blockchain, the bytecode sequence of the locking script of the spending transaction can be replicated to generate a "new" spending transaction. In this manner, part of the "old" spending transaction is duplicated into a transaction which spends it. In this case, the input of the "new" spending transaction can reference this "old" spending transaction and the output of the "new" spending transaction can include the locking script that includes a copy of the bytecode sequence of the locking script of this "old" spending transaction. The validation process of the "new" spending transaction can equate the "old" spending transaction to a previous transaction as part of the validation process.

Furthermore, the number of bytecode operations of the locking script that will be executed when validating the "new" spending transaction, which is dictated by the difference between the execution pointer of the current execution state of locking script as included in the "old" spending transaction and the execution pointer of the next execution state of locking script as included in the "new" spending transaction, can be varied by design by selecting or varying the execution pointer of the next execution state of locking script as included in the "new" spending transaction. In this manner, the number of bytecode operations of the locking script that will be executed when validating the "new" spending transaction can be either constrained or be used in parameterizing a constraint on the "new" spending transaction (which is the transaction spending the locking script). This parameterized constraint can be used to limit the number of bytecode operations executed between transactions (for example, to avoid inefficient operation of the bytecode sequence of the smart contract), to logically partition the bytecode sequence of the smart contract into different segments that are executed over a sequence of spending transactions, to calculate a reward for the entity creating the new transaction based on the parameterized constraint, or for other possible uses.

Also note that in one or more embodiments as described above, for a given locking script, the spending transaction is a transaction that references that locking script in one of its inputs, and the previous transaction is a transaction that contains a locking script referenced in one of spending transaction's inputs. Furthermore, there can be as many previous transactions as there are inputs in the spending transaction. Moreover, the blockchain protocol might not allow a locking script to query its spending transaction or one of its previous transactions. However, as transactions are simply just data with certain properties, and locking scripts are simply encoding constraints on the unlocking script to contain certain data, these properties can be exploited to provide a locking script that causes the injection of spending transaction and the previous transaction into the unlocking script. This allows a locking script to constrain the spending transaction (e.g., the spending transaction must have one output), and also to extract data from the previous transaction. Note that locking script cannot constrain the previous transaction as it will be already written to the blockchain. A combination of both means that the locking script can extract data from the previous transaction and constrain the spending transaction provided that locking scripts of the previous transaction and the spending transaction contain the same bytecode sequence.

Furthermore, the bytecode sequence of the locking scripts as well as the unlocking and locking scripts themselves can be considered to be computer programs. As such, the unlocking and locking scripts require access to the memory system of the CPU that executes the unlocking and locking scripts. In embodiments, a portion of the memory system, which is referred to herein as virtual memory, can be allocated and managed to store the bytecode sequence and associated data of the locking scripts and unlocking scripts.

Note that the bytecode interpreter of the locking script as described herein can be configured to support a variety of bytecode operations as dictated by design of the system. However, it is almost certain that a set of the supported bytecode operations will allow interaction with the virtual memory. In the Bitcoin Script language, there is a range of bytecodes that deal with memory management. A few are shown below:

OP_TOALTSTACK: Move the top item from the main stack to the top of the alternate stack.

OP_FROMALTSTACK: Move the top item from the alternate stack to the top of the main stack.

OP_SWAP: Swap the top two items on the stack.

OP_PICK: Get a specific item in the stack, and copy it to the top.

OP_ROLL: Get a specific item in the stack, and place it to the top.

Figure 5:
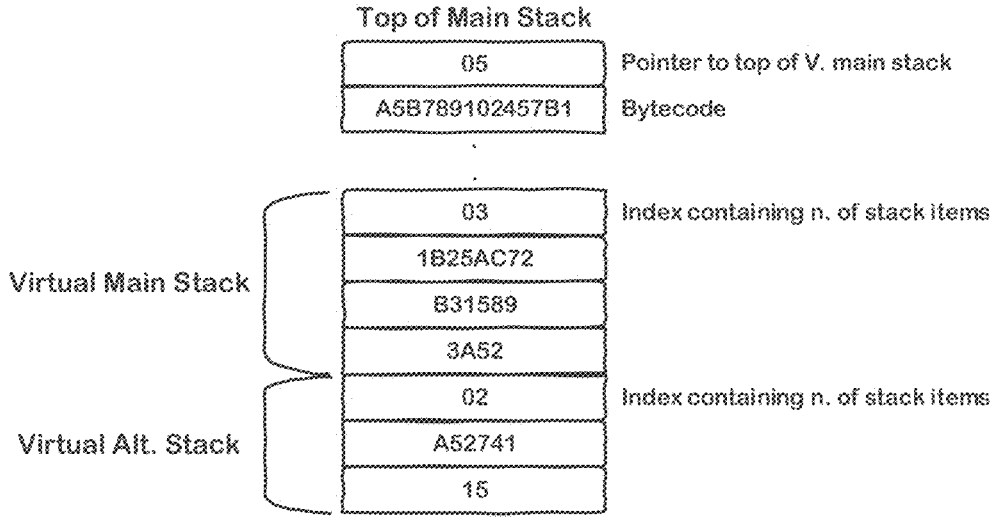
FIG. 5 is a schematic illustration of exemplary virtual stack data structures that can be used for executing the bytecode sequence of a locking script in accordance with an embodiment.

Furthermore, in embodiments described herein, the bytecode sequence of the locking script can include high-level bytecode operations (or "virtual bytecode operations") that are interpreted into corresponding sequences or combinations of low-level bytecode operations that are supported by the software interpreter of the run-time system (e.g., blockchain client) of the validation node. In this case, the bytecode sequence of the locking script is essentially a program within a program, much like how software runs on top of an operating system. In such embodiments, the state data and execution pointers for the locking script can be maintained in two virtual stacks that reside in virtual memory as shown in FIG. 5, which are commonly referred to as Virtual Main Stack and Virtual Alt Stack and can be stored as part of Bitcoin's Main Stack. Note that the Virtual Main Stack is on top of Virtual Alt Stack. To keep track of the start of these two stack data structures, the Main Stack contains a pointer to the top of Virtual Main Stack. Each of these two stack data structures can store a set of items, the first being the stack height (not counting itself), followed by the data. In this configuration, the state data and execution pointers for the locking script are effectively stored in the two virtual memory data structures (Virtual Main Stack and Virtual Alt Stack) that are embedded within another larger virtual memory data structure (the Main Stack).

For example, Tables 3A and 3B illustrate two high-level bytecode operations, referred to as VOP_SWAP and VOP_DROP, that work on the Virtual Main Stack and Virtual Alt Stack of FIG. 5 as follows.

TABLE 3A

| VOP_SWAP | // Top of Main Stack is start of Virtual Main Stack |
| | // Move Height of Virtual Main Stack to Alt Stack |
| | OP_TOALTSTACK |
| | // Perform the Swap |
| | OP_SWAP |
| | // Restore Height of Virtual Main Stack from Alt Stack |
| | OP_FROMALTSTACK |

TABLE 3B

| VOP_DROP | // Top of Main Stack is start of Virtual Main Stack |
| | // Move Height of Virtual Main Stack to Alt Stack |
| | OP_TOALTSTACK |
| | // Perform the Swap |
| | OP_DROP |
| | // Restore Height of Virtual Main Stack from Alt Stack |
| | OP_FROMALTSTACK |
| | // Decrement Height of Virtual Main Stack |
| | OP_1SUB |

Note that scripts for these two bytecode operations assume that any necessary error checking (e.g. Height of Virtual Main Stack>=2) is performed prior to executing the respective operation.

Figure 6:
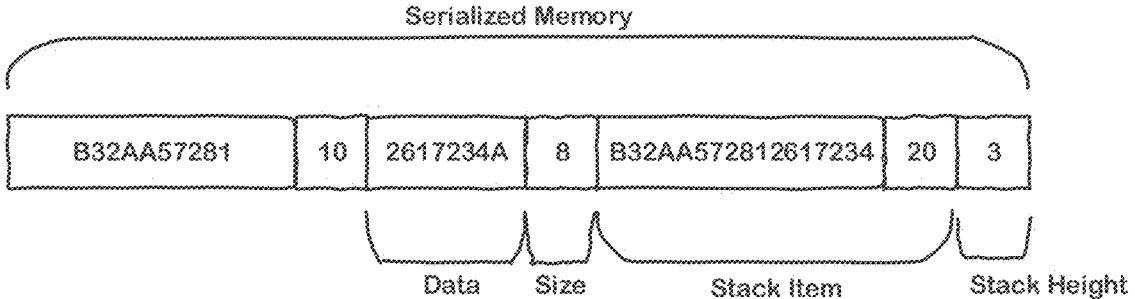
FIG. 6 is a schematic illustration of serialized state data that can be stored as part of the locking script of FIG. 3 in accordance with an embodiment.

In the embodiments described herein, the current execution state of the bytecode sequence of the locking script as included in the previous transaction is extracted or retrieved from the virtual memory for processing (e.g., see 411 as described above). Similarly, after the execution of bytecode sequence of the locking script, the resulting execution state of the bytecode sequence of the locking script as stored in the virtual memory is organized as serialized state data and compared to the serialized state data that is included in the locking script of the spending transaction (e.g., see 419, 421 and 423 as described above). In embodiments, the state data of the locking script has two formats: a first serialized format for embedding in a transaction, and a second format for "easy/direct" interpretation and manipulation in the virtual memory. Furthermore, the change from the first serialized format to the second format (which can be part of 411 as described above) can be referred to as deserialization, and the change from the second format to the first serialized format can be referred to as serialization (which can be part of 419 as described above). FIG. 5 illustrates the second format. FIG. 6 illustrates the first serialized format where the execution state data is represented by an ordered byte string that includes the following:

a stack height field, which encodes the number of stack items in the byte string several stack items that each include a size field and a data field, where the size field indicates the number of bytes of the data field of the stack item.

Figure 7:
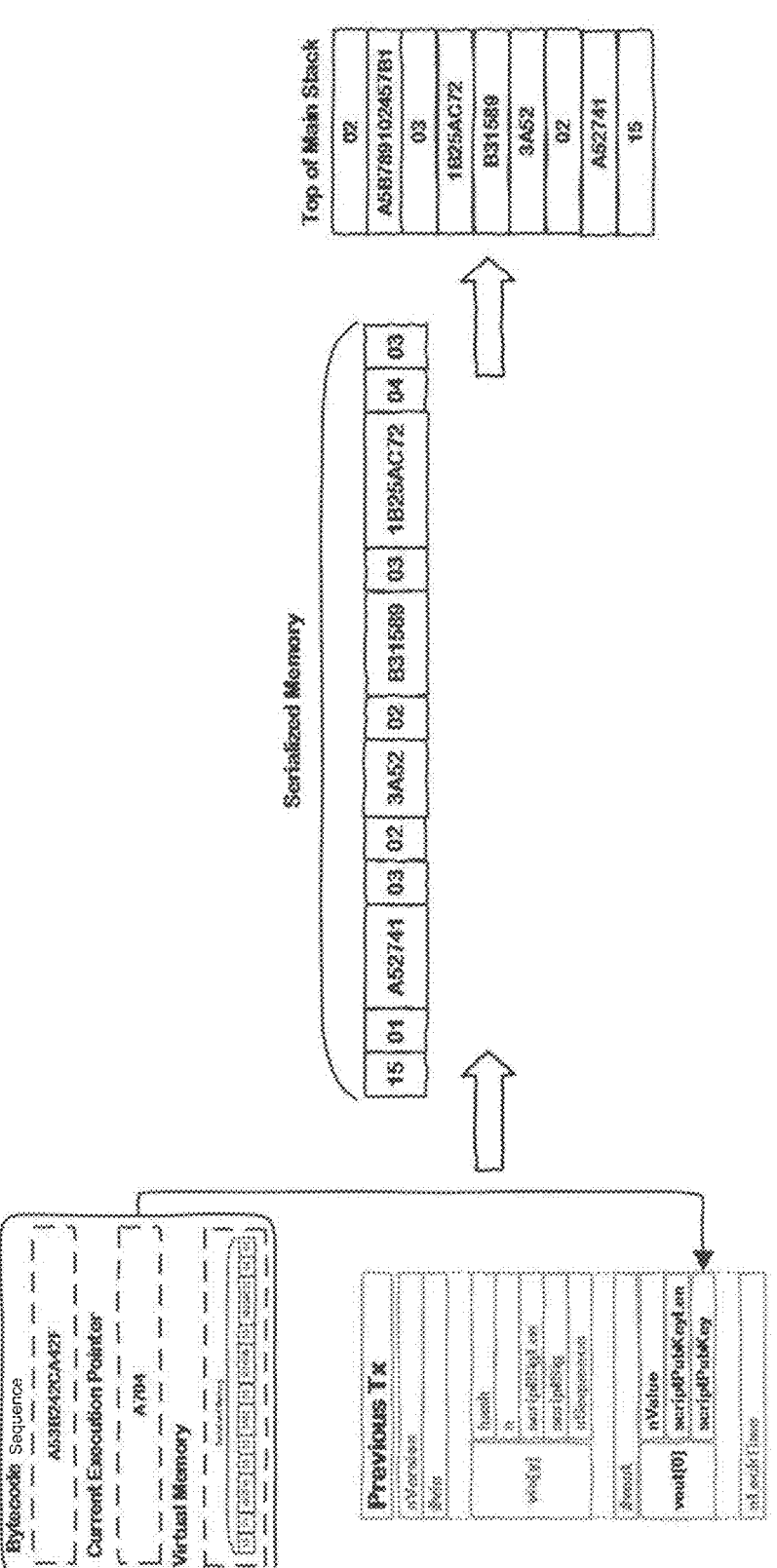
FIG. 7 is a schematic illustration of operations that can be used to transform serialized state data stored as part of the locking script into a format suitable for storage on the stack data structures of FIG. 5 in accordance with an embodiment.

FIG. 7 illustrates the deserialization of the byte string representing current execution state of the bytecode sequence of the locking script as included in the previous transaction for storage in virtual memory in a manner that restores the current state of the bytecode sequence of the locking script (e.g., see 411 as described above). An example script that deserializes the byte string representing the current state of the bytecode sequence of the locking script as included in the previous transaction for storage in the Virtual Main Stack and Virtual Alt Stack of FIG. 5 is provided in the following Table 4.

TABLE 4

| OP_DESERIALIZEVSTACKS | // Assume Serialized Virtual Stack byte string is at the top of main stack<br>// Split the byte string into 2 parts:<br>// 1. Byte String minus Single Byte from the Right<br>OP_DUP OP_SIZE OP_1SUB OP_LEFT<br>// 2. Single Byte from the Right (Virtual Stack Height)<br>OP_SWAP <1> OP_RIGHT<br>// We need 3 copies of Virtual Stack Height: one for extraction loop, one for pulling stack items from alt stack loop, and one for the actual Virtual Stack itself<br>OP_TUCK OP_DUP OP_TOALTSTACK<br>// --------- Extraction Loop Script (Repeat many times) -------<br>// Save a copy of No. of Stack Items Remaining<br>OP_DUP OP_TOALTSTACK<br>OP_IF // If Items still remain<br>// Split the remaining byte string into 2 parts:<br>// 1. Single Byte from the Right (Stack Item Size)<br>OP_DUP <1> OP_RIGHT<br>// 2. Byte String minus Single Byte from the Right<br>OP_SWAP OP_SIZE OP_1SUB OP_LEFT<br>// Extract Stack Item and push to Alt Stack<br>OP_2DUP OP_SWAP OP_RIGHT<br>OP_TOALTSTACK<br>// Byte String Length minus Stack Item<br>OP_SIZE OP_ROT OP_SUB<br>OP_DUP<br>OP_IF // Length isn't 0, Extract Remaining Byte String<br>OP_LEFT<br>OP_ELSE<br>OP_DROP OP_DROP<br>OP_ENDIF<br>// Get Stack Item and No. of Stack Items Remaining from Alt Stack<br>OP_FROMALTSTACK OP_FROMALTSTACK<br>// Push Stack Item back to Stack and Decrement No. of Stack Items Remaining<br>OP_SWAP OP_TOALTSTACK OP_1SUB<br>OP_ELSE // If no items remain, just grab No. of Stack Items Remaining<br>OP_FROMALTSTACK<br>OP_ENDIF<br>// -------------- Extraction Loop End --------------<br>// No. of Stack Items Remaining should now be 0, drop it<br>OP_DROP<br>// Remember that we saved a copy of the Virtual Stack Height at the Start<br>// --- Get Virtual Stack Items From Alt Stack Loop Script (Repeat many times) ----<br>// Save a copy of No. of Stack Items Remaining on Alt Stack<br>OP_DUP OP_TOALTSTACK<br>OP_IF // If Items still remain on Alt Stack<br>// Grab No. of Stack Items Remaining, and Stack Item<br>OP_FROMALTSTACK OP_FROMALTSTACK<br>// Decrement No. of Stack Items Remaining<br>OP_SWAP OP_1SUB<br>OP_ELSE // If no items remain, just grab No. of Stack Items Remaining<br>OP_FROMALTSTACK<br>OP_ENDIF<br>// -------------- Extraction Loop End --------------<br>// No. of Stack Items Remaining should now be 0, drop it<br>// Also pull the Virtual Stack Height from alt stack<br>OP_DROP OP_FROMALTSTACK |

Figure 8:
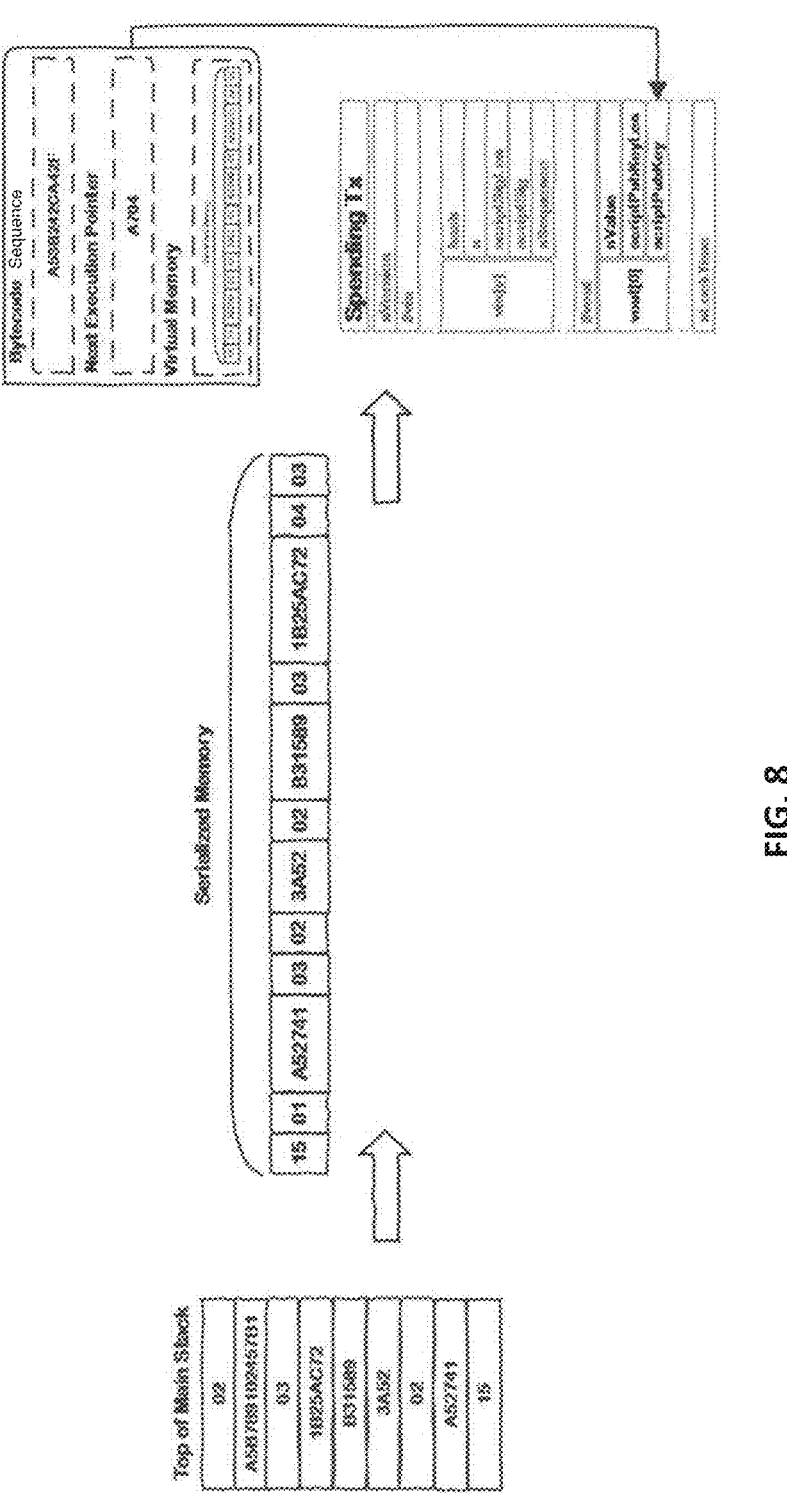
FIG. 8 is a schematic illustration of operations that can be used to transform state data stored in the format of the stack data structures of FIG. 5 into serialized state data suitable for storage within the locking script in accordance with an embodiment.

FIG. 8 illustrates the serialization of the resulting execution state of the bytecode sequence of the locking script as stored in the virtual memory into a serialized byte string representing the next state data of the bytecode sequence of the locking script as included in the spending transaction (e.g., see 419 as described above). An example script that serializes of the resulting execution state of the bytecode sequence of the locking script as stored in the Virtual Main Stack and Virtual Alt Stack of FIG. 5 into a serialized byte string representing the next state data of the bytecode sequence of the locking script as included in the spending transaction is provided in the following Table 5.

TABLE 5

```
OP_SERIALIZEVSTACK    // Assume Virtual Stack is at the top of main stack
                      // Save a copy of Virtual Stack Height to Alt Stack
                      // This is the Serialized Virtual Stack byte string to be
                      appended to
                      OP_DUP OP_TOALTSTACK
                      // -----------Loop Script (Repeat many times) --------------
                      // Save a copy of No. of Stack Items Remaining
                      OP_DUP OP_TOALTSTACK
                      OP_IF // If Items still remain
                            // Duplicate Item
                      OP_DUP
                      // Get Length of Item in Bytes
                      OP_SIZE
                      // Swap and concatenate so that Serialized Item is
                      <Item><Size>
                      OP_SWAP OP_CAT
                      // Decrement No. of Stack Items Remaining
                      OP_FROMALTSTACK OP_1SUB
                      // Swap the Serialized Item to the top
                      OP_SWAP
                      // Get the current Serialized Virtual Stack byte string and
                      append Serialized Item
                      OP_FROMALTSTACK OP_CAT
                      // Push it back to the Alt Stack
                      OP_TOALTSTACK
                      OP_ELSE // If no items remain, just grab No. of Stack
                      Items Remaining
                      OP_FROMALTSTACK
                      OP_ENDIF
                      // -------------- Loop End --------------
                      // Drop the No. of Stack Items remaining
                      OP_DROP
                      // Grab the Serialized Virtual Stack String
                      OP_FROMALTSTACK
```

In embodiments, the locking script that is replicated over the sequence of spending transactions can include interpreter code that is used to interpret the bytecode sequence of the locking script. The interpreter code can support the translation of high-level bytecodes or commands that extend or supplement the low-level bytecode operations that are supported by the software interpreter of the run-time system (e.g., blockchain client) of the validation node. For example, the interpreter code can support the translation of high-level bytecodes (or virtual bytecodes) into respective sequences or combinations of low-level bytecode operations that are supported by the software interpreter of the run-time system of the validation node. In this case, the interpreter code can support the translation of the virtual bytecode operations VOP_SWAP and VOP_DROP of Tables 3A and 3B into op_codes or commands that belong to the Bitcoin Script language and supported by the software interpreter of the run-time system (e.g., Bitcoin client) of the validation node. In another example, the interpreter code can support the translation of script bytecode operations written in a high-level programming language for interpretation by the software interpreter of the run-time system of the validation node. In this case, the interpreter code can support the translation of the script bytecode operations written in a high-level programming language into op_codes or commands that belong to the Bitcoin Script language and supported by the software interpreter of the run-time system of the validation node.

Furthermore, in embodiments, the validation process for each spending transaction of the smart contract can involve extracting the bytecode sequence of the locking script from the previous transaction, extracting the bytecode sequence of locking script from the spending transaction, verifying that these two extracted bytecode sequences match one another, extracting the interpreter code of the locking script from the previous transaction, extracting the interpreter code of locking script from the spending transaction, and verifying that these two extracted interpreter codes match one another.

Figure 9:
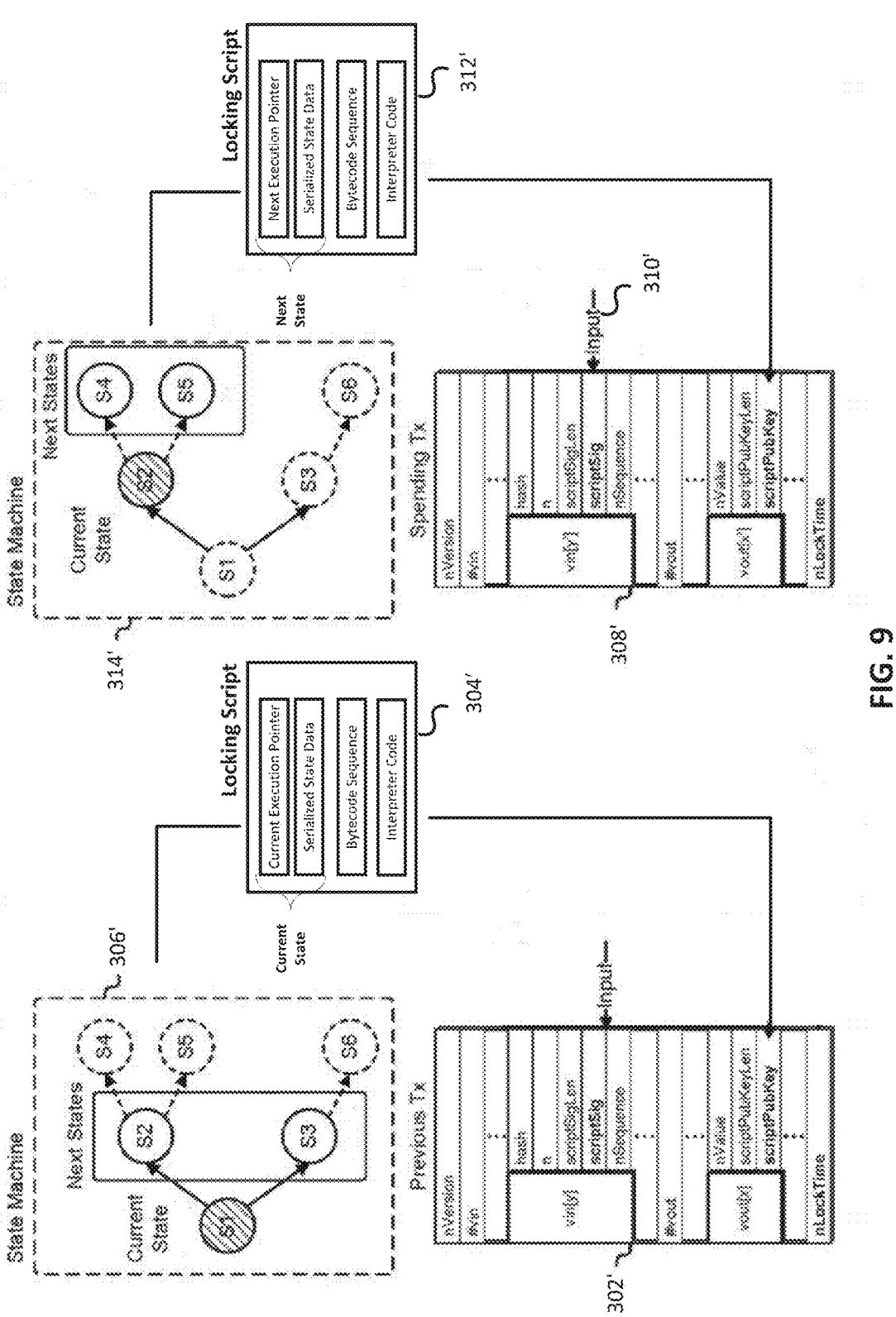
FIG. 9 illustrates another example of the locking script of FIG. 2, which employs a bytecode sequence and interpreter code to implement a trustless, deterministic state machine in accordance with an embodiment.

FIG. 9 illustrates exemplary transactions that employ a locking script with a common bytecode sequence and shared interpreter code to implement a trustless deterministic state machine in accordance with an embodiment of the present disclosure. More specifically, the common bytecode sequence is a computer program that can be thought of as a state machine that embodies a set of state rules with a well-defined set of states, whereby execution of the bytecodes of the bytecode sequence (computer program) provide for transitions between the states of the state machine. The shared interpreter code supports interpretation of the bytecode sequence of the locking script.

As illustrated schematically in FIG. 9, a previous transaction 302' includes a locking script 304' with a bytecode sequence which represents a set of state rules for a state machine 306' as well as interpreter code that supports interpretation of the bytecode sequence of the locking script 304'. The locking script 304' also includes a current state execution pointer (or "current execution pointer") and serialized state data that represent a current state within the states of the state machine 306' represented by the bytecode sequence of the locking script 304'. In the example shown, the current execution pointer and the serialized state data of the locking script 304' represent a current state "S1", and the set of state rules of the state machine 306' represented by the bytecode sequence offers two possible states ("S2" or "S3") for a next state that follows the current state S1. The current execution pointer included as part of the locking script 304' refers to an execution point of the bytecode sequence corresponding to the current state (in this case, state "S1"). The serialized state data includes as part of the locking script

304' represents the state of the state machine represented by the bytecode sequence at the execution point referred to by the current execution pointer included in the locking script 304'.

As can be seen in the example of FIG. 9, a spending transaction 308' includes a locking script 312' with a bytecode sequence which represents a set of state rules for a state machine 314' as well as interpreter code that supports interpretation of the bytecode sequence of the locking script 312'. The state machine 314' is a copy of the state machine 306' represented by the bytecode sequence of the locking script 304' of the previous transaction 302', and the interpreter code is a copy of the interpreter code of the locking script 304' of the previous transaction 302' The locking script 312' also includes a next state execution pointer (or "next execution pointer") and serialized state data that represent one of the possible next states (in this case, state "S2") that follows the current state S1. The next execution pointer included as part of the locking script 312' refers to an execution point of the bytecode sequence corresponding to next state (in this case, state "S2") that follows the current state S1. The serialized state data included as part of the locking script 312' represents the state of the state machine represented by the bytecode sequence at the execution point referred to by the next execution pointer included in the locking script 312'.

Note that the serialized state data that is included in the locking script 312' can be determined when creating the spending transaction by generating or accessing the next execution pointer that is included in the locking script 312', using the serialized state data of the locking script 304' of the previous transaction to restore the current state of execution of the bytecode sequence of the locking script, and then executing the bytecode sequence of the locking script. Such execution begins at the point (or operation) corresponding to the current execution pointer that is included in the previous transaction 302' and terminates at the point (or operation) corresponding to the next execution pointer that is included in the locking script 312'. Such execution can also use input data 310' determined by execution of the unlocking script of the spending transaction 308'.

As part of validating the spending transaction 308', the unlocking script of the spending transaction 308' and the common bytecode sequence of the locking scripts 304/312' are executed. The execution of the common bytecode sequence takes as input, the input data 310' determined by execution of the unlocking script of the spending transaction 308' and the current state "S1" embodied by the current execution pointer and serialized state data that is included in the locking script 304' of the previous transaction 302' and the next execution pointer that is included in the locking script 312' of the spending transaction 308', and invokes the shared interpreter code to interpret the common bytecode sequence of the locking scripts from the point (or operation) corresponding to the current state execution pointer that is included in the locking script 304' of the previous transaction 302' to the point (or operation) corresponding to the next execution pointer that is included in the locking script 312' of the spending transaction 308'. Such interpretation determines an appropriate next state (such as the second state "S2") from the set of state rules 314' represented by the bytecode sequence. This next state (such as the state "S2"), which is determined from the interpretation of the bytecode sequence to the point (or operation) corresponding to the next execution pointer that is included in the locking script 312' of the spending transaction 308', is organized as serialized state data that follows the serialized format of the state data that is included as part of the locking script 312' of the spending transaction 308'. The serialized state data determined from the interpretation of the bytecode sequence is then verified against the serialized state data that is included as part of the locking script 312' of the spending transaction 308'. Again, rather than creating a different spending transaction for each transaction, the execution of the locking script enforces that the execution state that results from the execution of the bytecode sequence of the locking script during validation of spending transaction matches the expected resultant execution state of the locking script as included in the spending transaction when creating the spending transaction. If these two resultant execution states are identical, the locking script for the spending transaction 308' is assured to be valid.

Note that the example of FIG. 9 shows that the states of the state machine represented by the bytecode sequence of the locking script 312' of the spending transaction 308' provides new states "S4" or "S5" that are possible for a next state transition from the state "S2." Note that the set of state rules represented by the bytecode sequences of the locking scripts may be coded as switch statement or other conditional statement (e.g., "if-then-else") parameterized by the current state and one or more inputs.

In embodiments, the bytecode sequence that is included in the locking script of a transaction represents the set of state rules of the state machine, and the execution pointer and the serialized state data that is included in the locking script of the transaction represents state of the state machine. The locking script also includes interpreter code that is used to interpret of the bytecode sequence of the locking script. In such embodiments, the bytecode sequence and interpreter code of the locking script of a transaction is copied or replicated to every spending transaction that attempts to transfer control of the digital asset to a next transaction, which must be linked to the current transaction. This process is repeated until the termination condition is fulfilled. Because the input data determined by the execution of the unlocking script of the spending transaction is not fixed and can be undetermined data, the state of the state machine can be made to change based on particular external inputs. Thus, the undetermined data provides the input that can affect the next state.

Furthermore, the number of bytecode operations of the locking script that will be interpreted when validating the spending transaction, which is dictated by the difference between the execution pointer of the current execution state of bytecode sequence of locking script as included in the previous transaction and the execution pointer of the next execution state of the bytecode sequence of the locking script as included in the spending transaction, can be varied by design by selecting or varying the execution pointer of the next execution state of the bytecode sequence of the locking script as included in the spending transaction. In this manner, the number of bytecode operations of the locking script that will be interpreted when validating the spending transaction can be either constrained or be used in parameterizing a constraint on the spending transaction (which is the transaction spending the locking script). This parameterized constraint can be used to limit the number of bytecode operations interpreted between transactions (for example, to avoid inefficient operation of the bytecode sequence of the smart contract), to logically partition the bytecode sequence of the smart contract into different segments that are executed over a sequence of spending transactions, to calculate a reward for the entity creating the new transaction based on the parameterized constraint, or for other possible uses.

The following Table 6 illustrates an example of unlocking script and locking script that implement a trustless deterministic state machine of the present disclosure.

TABLE 6

| Unlocking Script of Spending Tx | Locking Script of Previous Tx |
|---|---|
| <External Sig'><External Data><br><Serialized Previous Serialized Tx><br><SIGHASH Type><br><Serialized Set of Spending Tx Fields> | <Script to Check Termination Condition><br>// If not terminated<br>OP_NOTIF<br>// Check Smart Contract<br><Script to Extract Bytecode Sequence of the Locking Script of the Spending Tx><br><Script to Extract Bytecode Sequence of the Locking Script of the Previous Tx><br>// Check that the Bytecode Sequences of the Locking Scripts are the same<br>OP_EQUALVERIFY<br><Script to Extract Interpreter Code of the Locking Script of the Previous Tx><br><Script to Extract Interpreter Code of the Locking Script of the Spending Tx><br>// Check that the Interpreter Codes of the Locking Scripts are the same<br>OP_EQUALVERIFY<br><Script to Restore Current State using the Current State Data of the Locking Script><br><Script to Extract Execution Pointer to Current State of the Locking Script><br><Script to Extract Execution Pointer to Next State of the Locking Script><br>// Read Input<br><Script to Read Input from the Unlocking Script of the Spending Tx><br>< Script to invoke Interpreter code to interpret the bytecode sequence of the Locking Script, where such interpretation begins at the Execution Pointer for the Current State and ends at the Execution Pointer to the Next State ><br>// Check that the resulting execution state of the bytecode sequence evaluates as true<br>OP_VERIFY<br><script to store the resulting execution state of the bytecode sequence of the Locking Script as Serialized Next State Data><br><Script to retrieve Serialized Next State Data as included in the Locking Script of the Spending Tx><br>// Check that the Serialized Next State Data that results from execution of the bytecode sequence of the Locking Script matches the Serialized Next State Data as included in the Locking Script of the Spending Tx<br>OP_EQUALVERIFY<br>OP_ENDIF<br>// Check that Previous Tx, SIGHASH Type, and Spending Tx have been injected<br>OP_SELFTXINJECTION |

Figure 10A:
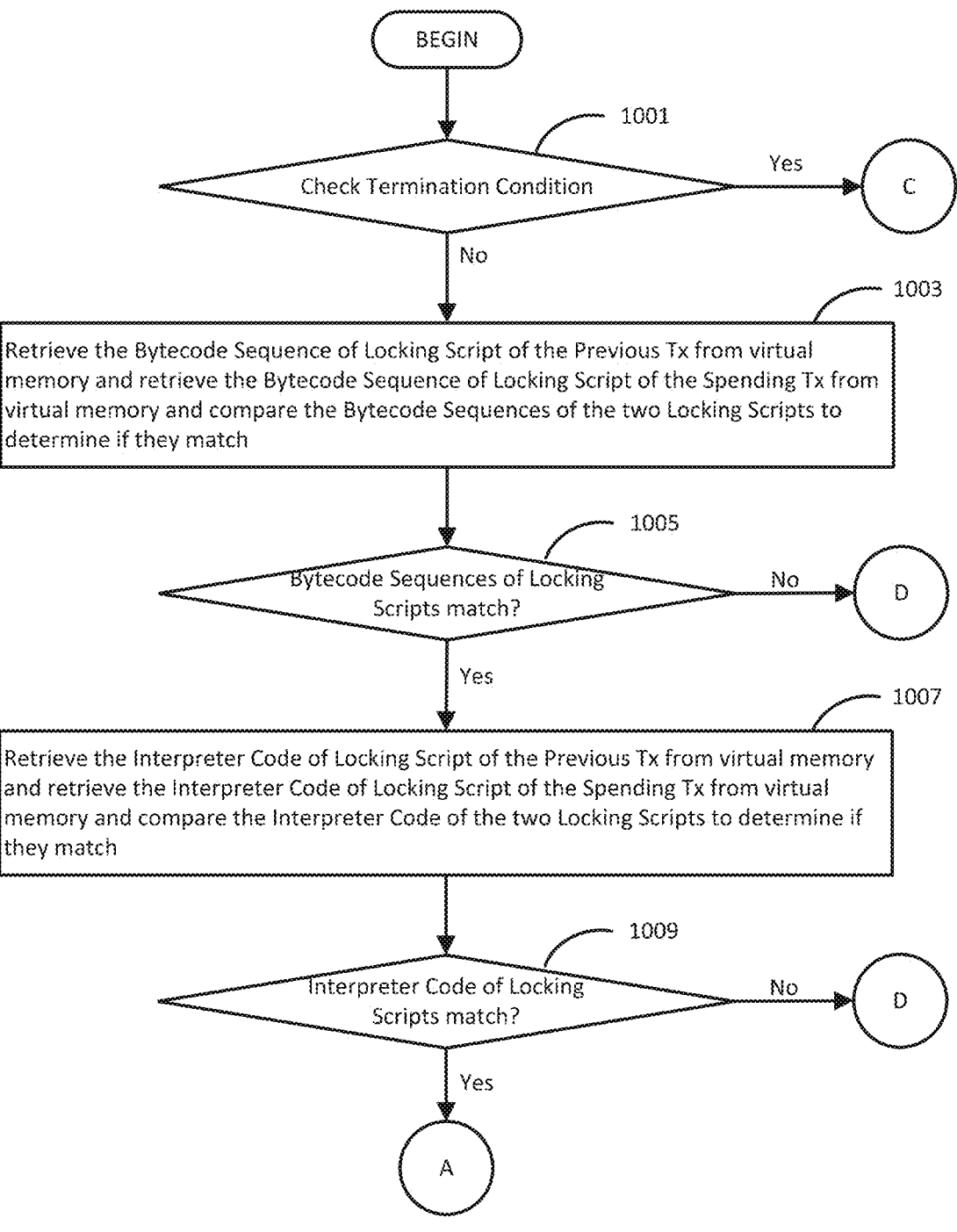
FIGS. 10A to 10C, collectively, is a flow chart that illustrates an example of operations that execute the unlocking script of the spending transaction and the locking script of the previous transaction of FIG. 9 in accordance with an embodiment.
Figure 10B:
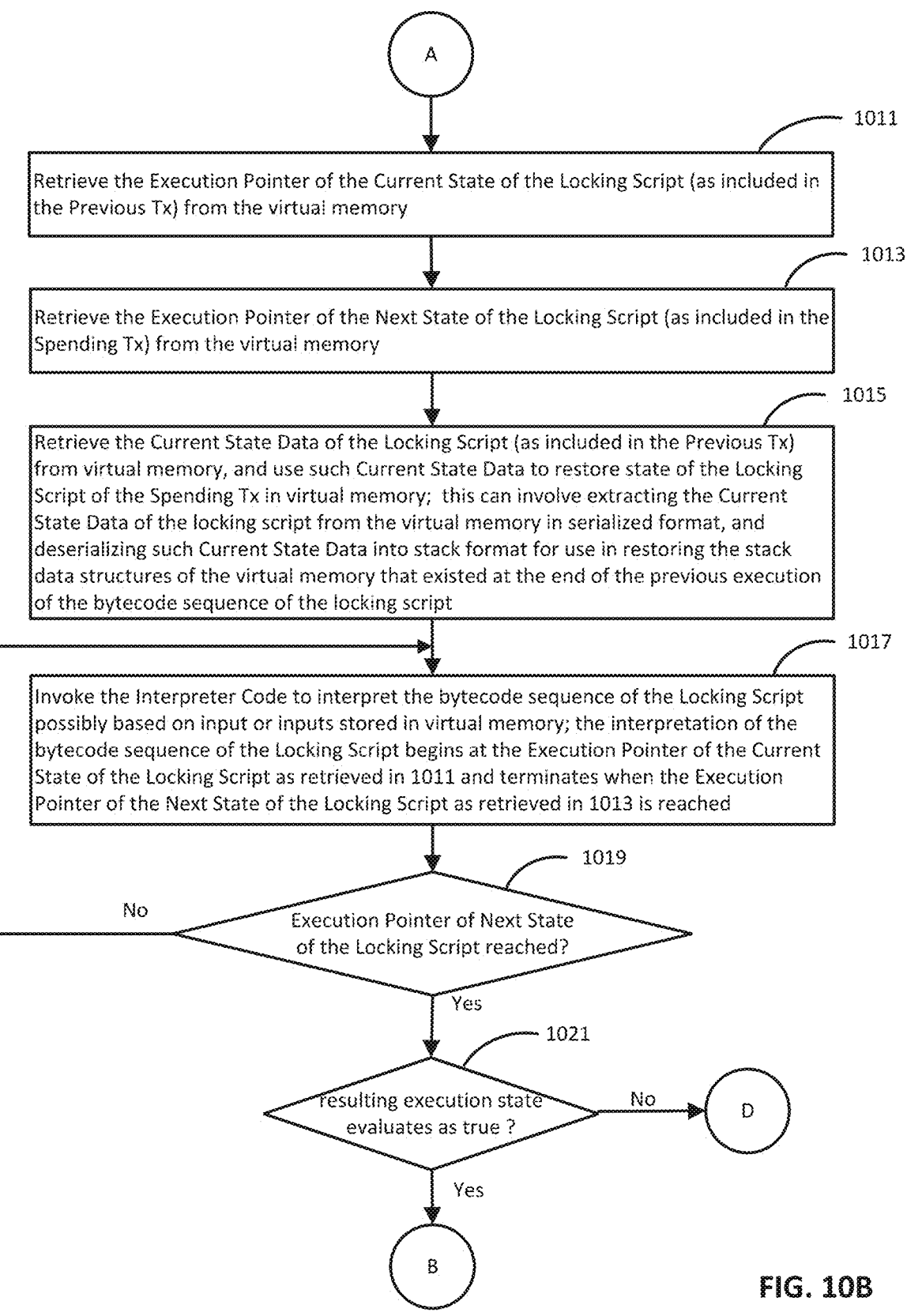
Figure 10C:
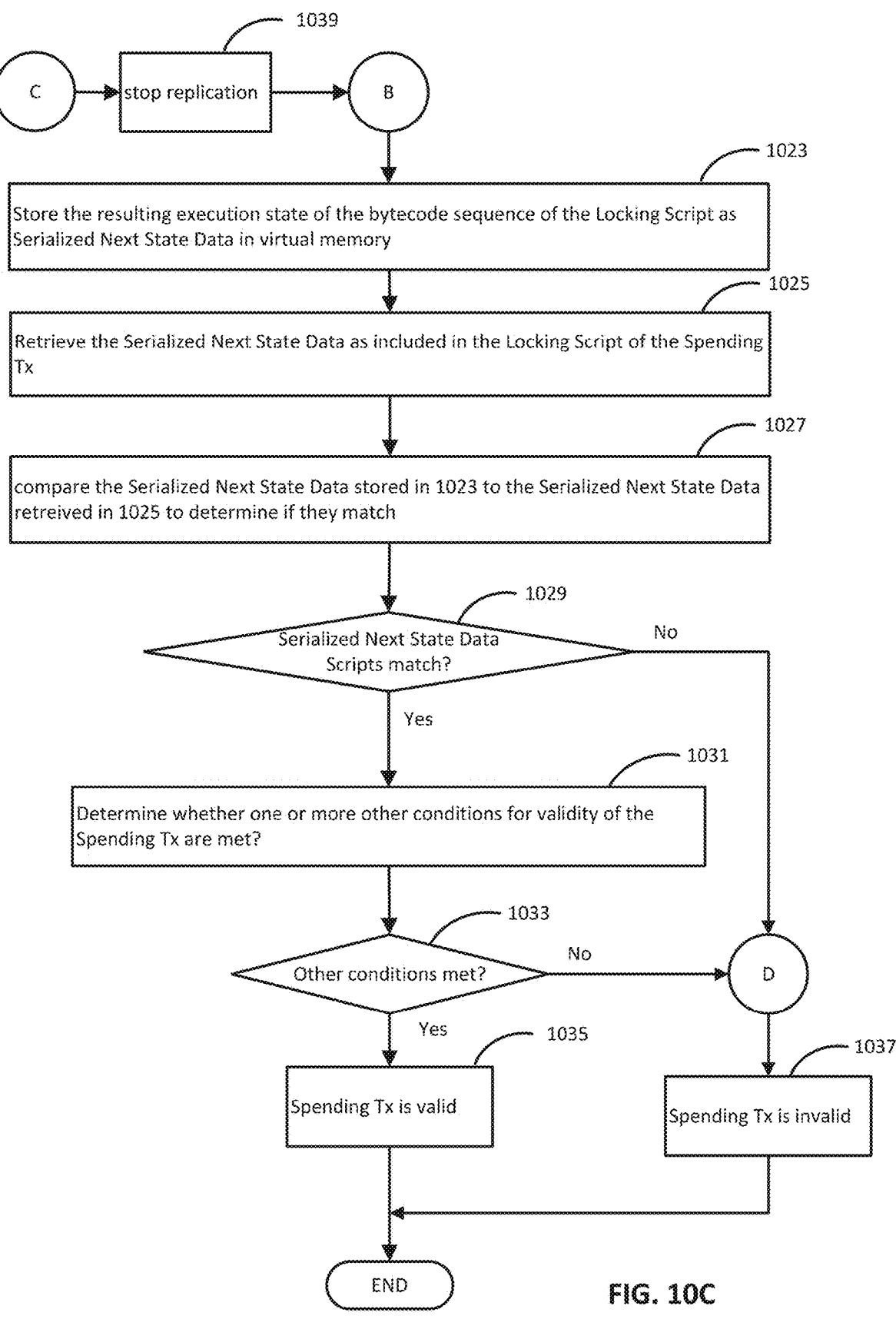

FIGS. 10A-10C, collectively, is a flowchart illustrating exemplary operations that execute the unlocking script of a spending transaction and the locking script of a previous transaction that is part of smart contract. The operations can be part of a validation process of the spending transaction. The spending transaction includes a locking script with a bytecode sequence and interpreter code which implement a trustless deterministic state machine in accordance with an embodiment of the present disclosure. The locking script also includes a next state execution pointer (or "next execution pointer") and serialized state data that represent the next execution state of the state machine. The next execution pointer included as part of the locking script refers to an execution point of the bytecode sequence corresponding to next execution state. The serialized state data included as part of the locking script represents the execution state of the state machine represented by the bytecode sequence at the execution point referred to by the next execution pointer included in the locking script. The interpreter code is used to interpret the bytecode sequence of the locking script.

Note that the serialized state data that is included as part of the locking script of the spending transaction can be determined when creating the spending transaction by generating or accessing the next execution pointer that is included in the locking script of the spending transaction, using serialized state data of the locking script of the previous transaction to restore the current execution state of the state machine, and then executing the bytecode sequence of locking script. Such execution begins at the point (or operation) corresponding to the current execution pointer that is included in the previous transaction and terminates at the point (or operation) corresponding to the next execution pointer that is included in the locking script of the spending transaction. Such execution can also use the input of the unlocking script of the spending transaction. It is contemplated that the creation of the spending transaction can involve operations involving a wallet, an agent node, or some other node of the blockchain network.

Some or all of the operations of FIGS. 10A-10C (or any other processes described, or variations and/or combinations of those processes) can be performed under the control of one or more computer systems configured with executable instructions and/or other data, and can be implemented as executable instructions executing collectively on one or more processors. The executable instructions and/or other data can be stored on a non-transitory, computer-readable storage medium (e.g., a computer program persistently stored on magnetic, optical, or flash media).

For example, some or all of the operations of FIGS. 10A-10C can be performed by a validation node in an example blockchain network, such as the example blockchain network 100 of FIG. 1. Such a validation node may be comprised of any suitable computing device (e.g., by a server in a data centre, by a client computing device, by multiple computing devices in a distributed system of a computing resource service provider, or by any suitable electronic client device such as the computing device 2600 of FIG. 13).

The operations of FIGS. 10A-10C verify that the both the bytecode sequences and interpreter codes of the locking scripts of the previous transaction and spending transaction of the smart contract are the same, obtain a current execution state from the previous transaction, obtain inputs from the execution the unlocking script of the spending transaction, determine the next execution state based at least in part on interpretation of the bytecode sequence of the locking scripts, and verify that the next execution state as determined from the execution of the locking script of the spending transaction matches the next execution state represented by next state data included as part of the locking script of the spending transaction. The operations of FIGS. 10A-10C reflect a variation of the example scripts found in Table 6. It is assumed that the locking script (e.g., scriptPubKey) of the previous transaction as well as the unlocking script (e.g., scriptSig) and the unlocking script (e.g., scriptSig) of the spending transaction are all stored in virtual memory, which can be realized by one or more run-time data structures, such as a stack, stack frame or heap.

In 1001, it is determined whether a termination condition is fulfilled. In embodiments, the termination condition can be a condition, which upon fulfillment, causes the state-machine transitions represented by the bytecode sequence of the locking script to end. If the termination condition is fulfilled, the operations proceed to 1039 where further replication of the locking script is avoided such that the replication of the locking script as part of the smart contract comes to an end and the operations continue to 1031 and 1033 as described below. If the termination condition is not fulfilled, the operations continue to 1003.

In 1003, the bytecode sequence of the locking script of the previous transaction is retrieved from the virtual memory and the bytecode sequence of the locking script of the spending transaction is retrieved from the virtual memory, and the bytecode sequences of the two locking scripts are compared to one another to determine if they match.

In 1005, it is determined if the bytecode sequences of the two locking scripts compared in 1003 match one another. If not, the operations continue to 1037 whereupon the spending transaction is determined to be invalid. If so, the operations continue to 1007.

In 1007, the interpreter code of the locking script of the previous transaction is retrieved from the virtual memory and the interpreter code of the locking script of the spending transaction is retrieved from the virtual memory, and the interpreter codes of the two locking scripts are compared to one another to determine if they match.

In 1009, it is determined if the interpreter codes of the two locking scripts compared in 1007 match one another. If not, the operations continue to 1037 whereupon the spending transaction is determined to be invalid. If so, the operations continue to 1011.

In 1011, the execution pointer for the current execution state of the bytecode sequence of the locking script (as included in the locking script of the previous transaction) is retrieved from the virtual memory.

In 1013, the execution pointer for the next execution state of the bytecode sequence of the locking script (as included in the locking script of the spending transaction) is retrieved from the virtual memory.

In 1015, the current state data of the locking script (as included in the locking script of the previous transaction) is retrieved from the virtual memory and is used to restore the execution state of the bytecode sequence of the locking script in virtual memory. For example, the current state data of the locking script can be extracted from the virtual memory in the serialized format, and then deserialized into the stack format for use in restoring the stack data structures of the virtual memory that existed at the end of the previous execution of the locking script (where the execution pointer was at the current state execution pointer as included in the locking script of the pervious transaction).

In 1017, the interpreter code (which is included in the locking script of the previous transaction) is invoked to interpret the bytecode sequence of the locking script possibly based on input or inputs stored in virtual memory. The interpretation of the bytecode sequence of the locking script begins at the execution pointer for the current execution state of the locking script as retrieved in 1011 and terminates when the execution pointer for the next execution state of the locking script as retrieved in 1013 is reached. In embodiments, the bytecodes of the bytecode sequence of the locking script are computer instructions that are designed for interpretation by the execution of the interpreter code which is included in the previous transaction.

In embodiments, the execution of the interpreter code translates the bytecodes of the bytecode sequence of the locking script into op-codes or commands that are supported by the software interpreter of the run-time system (e.g., blockchain client) of the validation node, which translates such opcode's or commands to machine code that is executed on the CPU hardware of the validation node as shown in FIG. 11. The execution of the interpreter code can support the translation of high-level bytecodes or commands that extend or supplement the low-level bytecode operations that are supported by the software interpreter of the run-time system of the validation node. For example, the interpreter code can support the translation of virtual bytecodes that represent a combination of bytecode operations that are supported by the software interpreter of the run-time system of the validation node. In this case, the interpreter code can support the translation of the virtual bytecode operations OP_VSWAP and OP_VDROP of Tables 4A and 4B into op_codes or commands that belong to the Bitcoin Script language and supported by the software interpreter of the run-time system (e.g., Bitcoin client) of the validation node. In another example, the interpreter code can support the translation of script bytecode operations written in a high-level programming language for interpretation by the software interpreter of the run-time system of the validation node. In this case, the interpreter code can support the translation of the script bytecode operations written in a high-level programming language into op_codes or commands that belong to the Bitcoin Script language and supported by the software interpreter of the run-time system of the validation node. The execution of the software interpreter can translate the opcodes' or commands into machine code sequentially one bytecode at a time (e.g., simple interpretation) or possibly employ just-in-time compilation methods where the bytecode sequence segment (or portions thereof) are compiled into machine code as necessary at runtime and then the resulting machine code is executed. The resulting machine code can possibly be cached and reused later without needing to be recompiled.

In 1019, it is determined whether the interpreter code has interpreted the bytecode sequence of the locking script to a point corresponding to the execution pointer for the next execution state of the bytecode sequence of the locking script. If not, the operations revert to 1017 where the execution of the interpreter code continues. If so, the operations continue to 1021.

In 1021, it is determined whether the resulting execution state as stored in the virtual memory evaluates as true. In embodiments, this check ensures that both the operations of the unlocking script of the spending transaction and the operations of the bytecode sequence of the locking script of the previous transaction have completed without error and that any and all conditions that are encoded by the unlocking script of the spending transaction and the locking script of the previous transaction have been satisfied. If not, the operations continue to 1037 whereupon the spending transaction is determined to be invalid. If so, the operations continue to 1023.

In 1023, the resulting execution state of the bytecode sequence of locking script as stored in virtual memory (after the execution pointer for the next execution state of the bytecode sequence of the locking script is reached) is organized and stored as serialized state data representing the next execution state of the bytecode sequence of the locking script. The serialized state data is in the serialized format as included in the spending transaction.

In 1025, the serialized state data representing the next execution state of the bytecode sequence of the locking script is retrieved from the virtual memory.

In 1027, the serialized state data representing the next execution state of the bytecode sequence of the locking script as determined in 1023 is compared to the serialized state data representing the next execution state of the bytecode sequence of the locking script as included in the spending transaction as retrieved from the virtual memory in 1025 to determine if the serialized state data match.

In 1029, it is determined whether the serialized state data match. If so, the operations continue to 1031. If not, the operations continue to 1037 whereupon the spending transaction is determined to be invalid.

In 1031 and 1033, the operations determine whether one or more other conditions for validity of the spending transaction are met. Such conditions can involve other constraints specified in the unlocking script of the previous transaction and the locking script of the spending transaction. If so, the operations continue to 1035 whereupon the spending transaction can be considered valid by the system performing the validation process. If not, the operations continue to 1037 whereupon the spending transaction is determined to be invalid. Note that one or more of the operations performed in 1001-1039 may be performed in various orders and combinations, including in parallel.

Also note that if the spending transaction is determined to be valid (e.g., in 1035) and possibly stored on the blockchain, the bytecode sequence of the locking script of the spending transaction can be replicated to generate a "new" spending transaction. In this manner, part of the "old" spending transaction is duplicated into a transaction which spends it. In this case, the input of the "new" spending transaction can reference this "old" spending transaction and the output of the "new" spending transaction can include the locking script that embeds a copy of the bytecode sequence and shared interpreter code of the locking script of this "old" spending transaction. The validation process of the "new" spending transaction can equate the "old" spending transaction to a previous transaction as part of the validation process.

Furthermore, the number of bytecode operations of the locking script that will be interpreted when validating the "new" spending transaction, which is dictated by the difference between the execution pointer of the current execution state of bytecode sequence of the locking script as included in the "old" spending transaction and the execution pointer of the next execution state of bytecode sequence of the locking script as included in the "new" spending transaction, can be varied by design by selecting or varying the execution pointer of the next execution state of bytecode sequence of the locking script as included in the "new" spending transaction. In this manner, the number of bytecode operations of the locking script that will be interpreted when validating the "new" spending transaction can be either constrained or be used in parameterizing a constraint on the "new" spending transaction (which is the transaction spending the locking script). This parameterized constraint can be used to limit the number of bytecode operations executed between transactions (for example, to avoid inefficient operation of the bytecode sequence of the smart contract), to logically partition the bytecode sequence of the smart contract into different segments that are executed over a sequence of spending transactions, to calculate a reward for the entity creating the new transaction based on the parameterized constraint, or for other possible uses.

Also note that in one or more embodiments as described above, for a given locking script, the spending transaction is a transaction that references that locking script in one of its inputs, and the previous transaction is a transaction that contains a locking script referenced in one of spending transaction's inputs. Furthermore, there can be as many previous transactions as there are inputs in the spending transaction. Moreover, the blockchain protocol might not allow a locking script to query its spending transaction or one of its previous transactions. However, as transactions are simply just data with certain properties, and locking scripts are simply encoding constraints on the unlocking script to contain certain data, these properties can be exploited to provide a locking script that causes the injection of spending transaction and the previous 10 transaction into the unlocking script. This allows a locking script to constrain the spending transaction (e.g., the spending transaction must have one output), and also to extract data from the previous transaction. Note that locking script cannot constrain the previous transaction as it will be already written to the blockchain. A combination of both means that the locking script can extract data from the previous transaction and constrain the spending transaction provided that locking scripts of the previous transaction and the spending transaction contain the same bytecode sequence.

Furthermore, the bytecode sequence of the locking scripts as well as the unlocking and locking scripts themselves can be considered to be computer programs. As the bytecode sequence is embedded within the locking script, it is essentially a program within a program, much like how software runs on top of an operating system. As such, the unlocking and locking scripts require access to the memory system of the CPU that executes the unlocking and locking scripts. In embodiments, a portion of the memory system, which is referred to herein as virtual memory, can be allocated and managed to store the bytecode sequence and associated data of the locking scripts and unlocking scripts.

Figures 12A, 12B:
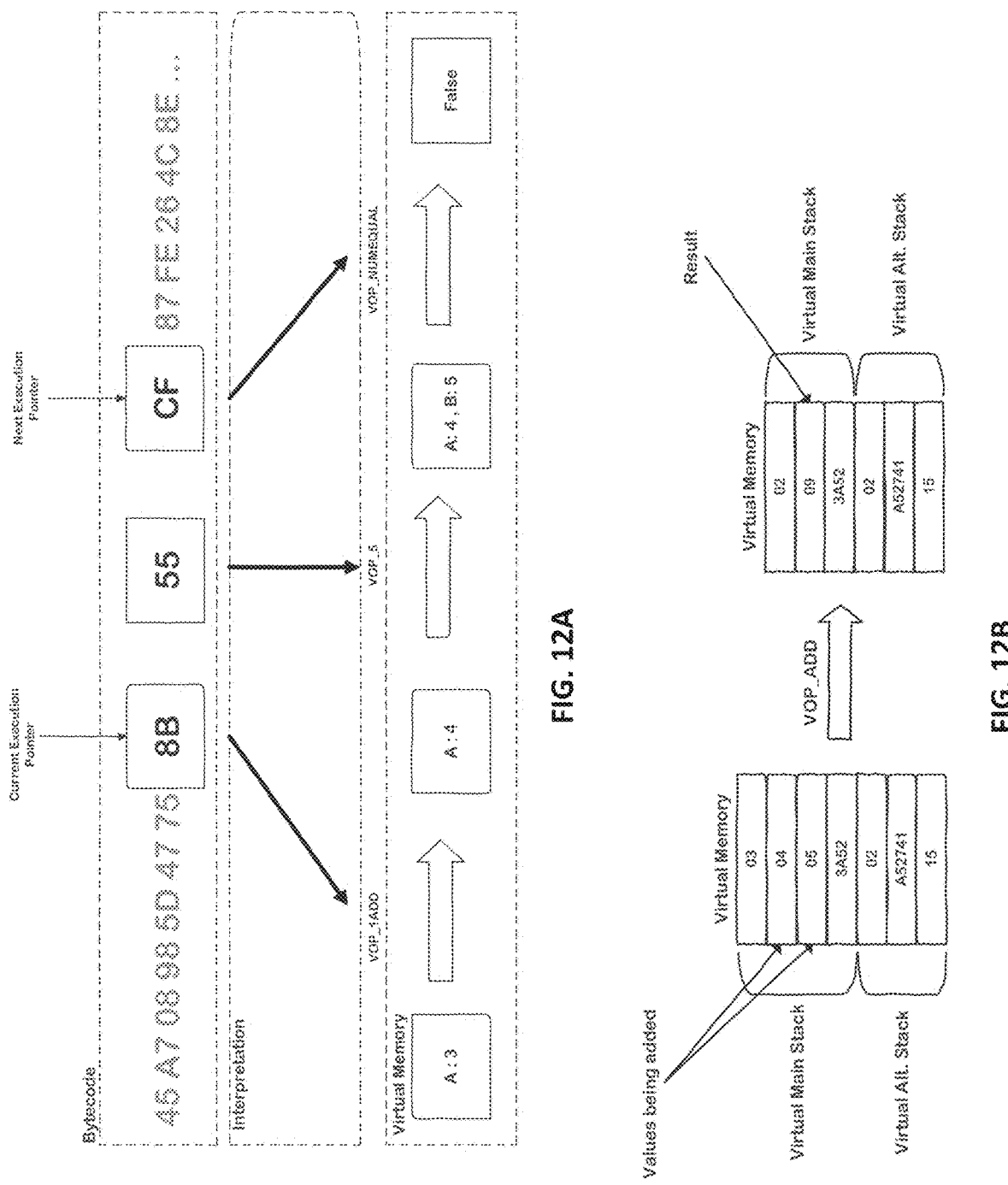
FIGS. 12A and 12B are schematic illustrations of exemplary operations of the interpreter code of the locking script as part of the operations of FIGS. 10A to 10C, which interpret a VOP_ADD bytecode as part of the locking script.

FIG. 12A illustrate exemplary operations carried out by execution of the Interpreter code in interpreting the bytecode sequence that is included in a locking script. In embodiment(s), the both the interpreter code and the bytecode sequence are included as part of the locking script as described herein. For the virtual memory of FIG. 5, the interpretation of the bytecode sequence can involve first restoring the Virtual Main Stack and Virtual Alt Stack from the current state of the locking script, and then interpreting single bytecodes starting from execution pointer of the current state until reaching the execution pointer of the next state.

As part of interpreting the bytecodes, the execution of the Interpreter code can operate to get the next bytecode needing interpretation. Table 7 below provides an opcode, referred to as OP_GETOP, that performs this function. This opcode essentially takes the interpreted bytecode, extracts the current position from the previous transaction, and returns to the top of the stack the bytes required, in this case the next bytecode.

TABLE 7

| OP_GETOP | //Get a substring of the length <num of bytes> OP_DUP <Script to Extract Position from Previous Tx> <num of bytes> OP_SUBSTR |
|---|---|

Table 8 below is a script that describes the execution of the Interpreter code that operates to interpret an exemplary bytecode, particularly the VOP_ADD bytecode which is shown schematically in FIG. 12B.

TABLE 8

| VOP_ADD | <VOP_ADD Opcode> OP_EQUAL OP_IF //Move top two stack items above stack height     OP_ROT OP_ROT //Execute Opcode OP_ADD //Decrement height counter, and move height back to top OP_1 OP_ROT OP_SWAP OP_SUB OP_ENDIF |
|---|---|

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

Figure 13:
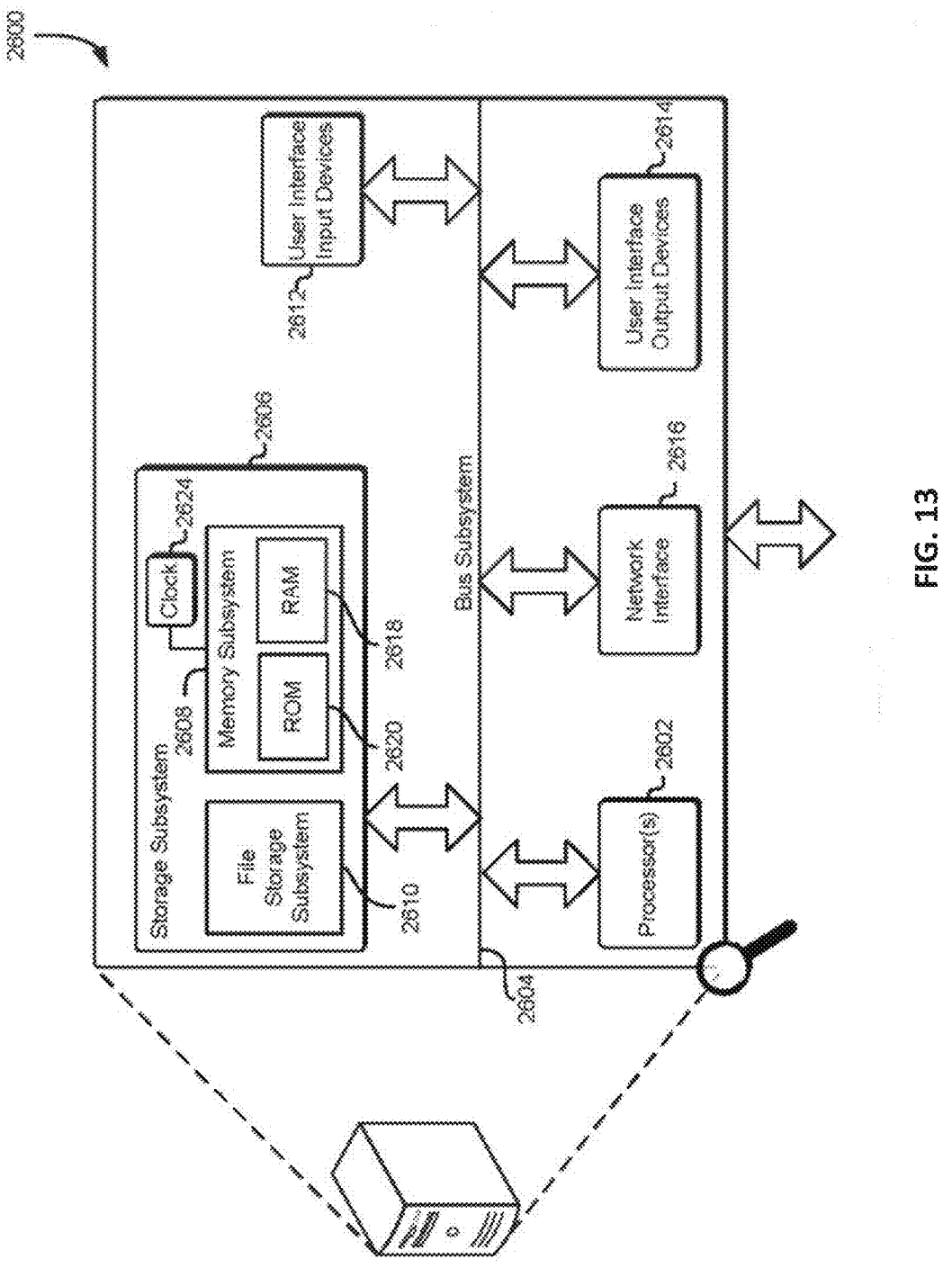
FIG. 13 illustrates a computing environment in which various embodiments can be implemented.

FIG. 13 is an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured for use as a data server, a web server, a portable computing device, a personal computer, or any electronic computing device. As shown in FIG. 13, the computing device 2600 may include one or more processors 2602 that may be configured to communicate with, and are operatively coupled to, a number of peripheral subsystems via a bus subsystem 2604. The processors 2602 may be utilized for the processing of the unlocking and locking scripts as part of validating a spending transaction as described herein. These peripheral subsystems may include a storage subsystem 2606, comprising a memory subsystem 2608 and a file/disk storage subsystem 2610, one or more user interface input devices 2612, one or more user interface output devices 2614, and a network interface subsystem 2616. Such storage subsystem 2606 may be used for temporary or long-term storage of information, such as details associated with transactions described in the present disclosure.

The bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses. The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a wireless network such that the data technician may be able to transmit and receive data while in a remote location, such as a user data centre. The bus subsystem 2604 may be utilized for communicating data such as details, search terms, and so on to the supervised model of the present disclosure, and may be utilized for communicating the output of the supervised model to the one or more processors 2602 and to merchants and/or creditors via the network interface subsystem 2616.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600. The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. The storage subsystem 2606 may comprise a memory subsystem 2608 and a file/disk storage subsystem 2610.

The memory subsystem 2608 may include a number of memories, including a main random-access memory (RAM) 2618 for storage of instructions and data during program execution and a read only memory (ROM) 2620 in which fixed instructions may be stored. The file/disk storage subsystem 2610 may provide a non-transitory persistent (non-volatile) storage for program and data files and may include a hard disk drive, a floppy disk drive along with associated removable media, a Compact Disk Read Only Memory (CD-ROM) drive, an optical drive, removable media cartridges, and other like storage media.

The computing device 2600 may include at least one local clock 2624. The local clock 2624 may be a counter that represents the number of ticks that have transpired from a particular starting date and may be located integrally within the computing device 2600. The local clock 2624 may be used to synchronize data transfers in the processors for the computing device 2600 and all of the subsystems included therein at specific clock pulses and may be used to coordinate synchronous operations between the computing device 2600 and other systems in a data centre. In one embodiment, the local clock 2624 is an atomic clock. In another embodiment, the local clock is a programmable interval timer.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 13 is intended only as a specific example for purposes of illustrating the preferred embodiment of the device. Many other configurations having more or fewer components than the system depicted in FIG. 13 are possible.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising", "having", "including", and "containing" are to be construed as open-ended terms (i.e., meaning "including, but not limited to") unless otherwise noted. The term "connected", when unmodified and referring to physical connections, is to be construed as partly or wholly contained within, attached to or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset", unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C", or "at least one of A, B and C", unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

It should be noted that the above-mentioned embodiments illustrate rather than limit the invention, and that those skilled in the art will be capable of designing many alternative embodiments without departing from the scope of the invention, as defined by the appended claims. In the claims, any reference signs placed in parentheses shall not be construed as limiting the claims. The words "comprising", "comprises", and the like do not exclude the presence of elements or steps other than those listed in any claim or the specification as a whole.

In the present specification, "comprises" means "includes or consists of" and "comprising" means "including or consisting of". The singular reference of an element does not exclude the plural reference of such elements and vice-versa. The invention may be implemented by means of hardware comprising several distinct elements and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

What is claimed is:

1. A computer-implemented method comprising:
receiving a spending transaction to transfer control of at least one digital asset or portion thereof, wherein the spending transaction includes a locking script represented by a bytecode sequence, and wherein the spending transaction references a previous transaction that includes a locking script represented by a bytecode sequence such that first and second locking scripts share the same bytecode sequence; and
validating the spending transaction by verifying that the bytecode sequence of the locking script of the spending transaction matches the bytecode sequence of the locking script of the previous transaction, wherein:
at least part of the spending transaction is replicated to generate a new spending transaction until a termination condition is fulfilled; and
the bytecode sequence of the locking script is replicated as part of a locking script of an ordered number of spending transactions until the termination condition is fulfilled.

2. The computer-implemented method of claim 1, wherein the previous transaction is stored on a blockchain, and interpreter code supports translation of at least one high-level bytecode operation into low-level bytecode operations that are executed by a node.

3. The computer-implemented method of claim 1, wherein the locking script of the previous transaction and the locking script of the spending transaction further include data relating to different execution states of the bytecode sequence shared by the locking script of the previous transaction and the locking script of the spending transaction, where such data is used to control execution of interpretation of the bytecode sequence when validating the spending transaction.

4. The computer-implemented method of claim 2, wherein the locking script of the previous transaction further includes state data for a current execution state of the bytecode sequence of the locking script as well as an execution pointer corresponding to the current execution state of the bytecode sequence of the locking script, wherein the locking script of the spending transaction further includes state data for a next execution state of the bytecode sequence of the locking script as well as an execution pointer corresponding to the next execution state of the bytecode sequence of the locking script, and validating the spending transaction further involves:
i) using the state data representing the current execution state of the bytecode sequence of the locking script to restore the current execution state of the bytecode sequence;
ii) executing the bytecode sequence of the locking script beginning at the execution pointer corresponding to the current execution state of the bytecode sequence and ending at the execution pointer corresponding to a next execution state of the bytecode sequence; and
iii) comparing state data resulting from the execution of the bytecode sequence of the locking script to the state data for the next execution state of the bytecode sequence of the locking script as included in the spending transaction in order to verify that such state data match.

5. The computer-implemented method claimed in claim 4, wherein validating the spending transaction further involves extracting the state data for the current execution state of the bytecode sequence of the locking script from virtual memory, extracting the execution pointer corresponding to the current execution state of the bytecode sequence of the locking script from virtual memory, and extracting the execution pointer corresponding to the next execution state of the bytecode sequence of the locking script from virtual memory.

6. The computer-implemented method claimed in claim 5, wherein the virtual memory stores the state data relating to different execution states of the bytecode sequence in different first and second formats, wherein a first format is used to store such data as part of the locking script, and wherein the second format is suitable for manipulation of data in the virtual memory when executing the bytecode sequence of the locking script.

7. The computer-implemented method claimed in claim 6, wherein the virtual memory comprises at least one stack data structure, the first format comprises a serialized byte format, and the second format comprises a stack format.

8. The computer-implemented method claimed in claim 7, further comprising extracting state data for the current execution state of the bytecode sequence of the locking script from the virtual memory by deserialization of data representing the current execution state of the bytecode sequence from the serialized byte format to the stack format, and/or comparing state data resulting from execution of the bytecode sequence of the locking script to the state data for a next execution state of the bytecode sequence of the locking script as included in the spending transaction by serialization of the state data resulting from the execution of the bytecode sequence of the locking script from the stack format to the serialized byte format.

9. The computer-implemented method claimed in claim 1, wherein control of the at least one digital asset or portion thereof is transferred as a result of execution of the locking script and the locking script imposes a set of conditions for validation of the spending transaction.

10. The computer-implemented method claimed in claim 9, wherein the spending transaction further includes an unlocking script, and wherein execution of the unlocking script provides for data that is used to derive a set of conditions for validation of the spending transaction.

11. The computer-implemented method claimed in claim 1, wherein the spending transaction and the previous transaction embody parts of a smart contract.

12. A non-transitory computer-readable storage medium having stored thereon executable instructions that, as a result of being executed by a processor of a computer system, cause the computer system to at least perform the computer-implemented method of claim 1.

13. A system, comprising:

a processor; and memory including executable instructions that, as a result of execution by the processor, causes the system to perform a computer-implemented method comprising:

receiving a spending transaction to transfer control of at least one digital asset or portion thereof, wherein the spending transaction includes a locking script represented by a bytecode sequence, and wherein the spending transaction references a previous transaction that includes a locking script represented by a bytecode sequence such that first and second locking scripts share the same bytecode sequence;

validating the spending transaction by verifying that the bytecode sequence of the locking script of the spending transaction matches the bytecode sequence of the locking script of the previous transaction, wherein:

at least part of the spending transaction is replicated to generate a new spending transaction until a termination condition is fulfilled; and the bytecode sequence of the locking script is replicated as part of a locking script of an ordered number of spending transactions until the termination condition is fulfilled.

14. The system of claim 13, wherein the system is further configured to store the previous transaction on a blockchain, and interpreter code supports translation of at least one high-level bytecode operation into low-level bytecode operations that are executed by node.

15. The system of claim 13, wherein the locking script of the previous transaction and the locking script of the spending transaction further include data relating to different execution states of the bytecode sequence shared by the locking script of the previous transaction and the locking script of the spending transaction, where such data is used to control execution of interpretation of the bytecode sequence when validating the spending transaction.

16. The system of claim 13, wherein the locking script of the previous transaction further includes state data for a current execution state of the bytecode sequence of the locking script as well as an execution pointer corresponding to the current execution state of the bytecode sequence of the locking script, wherein the locking script of the spending transaction further includes state data for a next execution state of the bytecode sequence of the locking script as well as an execution pointer corresponding to the next execution state of the bytecode sequence of the locking script, and validating the spending transaction further involves:

i) using the state data representing the current execution state of the bytecode sequence of the locking script to restore the current execution state of the bytecode sequence;

ii) executing the bytecode sequence of the locking script beginning at the execution pointer corresponding to the current execution state of the bytecode sequence and ending at the execution pointer corresponding to a next execution state of the bytecode sequence; and iii) comparing state data resulting from the execution of the bytecode sequence of the locking script to the state data for the next execution state of the bytecode sequence of the locking script as included in the spending transaction in order to verify that such state data match.

17. The computer system of claim 13, wherein virtual memory stores data relating to different execution states of the bytecode sequence in different first and second formats, wherein a first format is used to store such data as part of the locking script, and wherein a second format is suitable for manipulation of data in the virtual memory when executing the bytecode sequence of the locking script.

18. The computer system of claim 17, wherein the virtual memory comprises at least one stack data structure, the first format comprises a serialized byte format, and the second format comprises a stack format.

19. The computer system of claim 18, further comprising extracting state data for a current execution state of the bytecode sequence of the locking script from the virtual memory by deserialization of data representing the current execution state of the bytecode sequence from the serialized byte format to the stack format, and/or comparing state data resulting from execution of the bytecode sequence of the locking script to the state data for the next execution state of the bytecode sequence of the locking script as included in the spending transaction by serialization of the state data resulting from the execution of the bytecode sequence of the locking script from the stack format to the serialized byte format.

20. The computer system of claim 13, wherein control of the at least one digital asset or portion thereof is transferred as a result of execution of the locking script and the locking script imposes a set of conditions for validation of the spending transaction.

\* \* \* \* \*